US012655052B2

(12) United States Patent
Will et al.

(10) Patent No.: US 12,655,052 B2
(45) Date of Patent: Jun. 16, 2026

(54) MELTING FURNACES AND CHARGING OF MELTING FURNACES

(71) Applicant: Owens-Brockway Glass Container Inc., Perrysburg, OH (US)

(72) Inventors: Steven M. Will, Sylvania, OH (US); Kirk Holmes, Perrysburg, OH (US); Victor A. Plumbo, II, Ventnor City, NJ (US); Karin Gabriela Bastarrachea, St Kilda (AU)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 624 days.

(21) Appl. No.: 17/861,993

(22) Filed: Jul. 11, 2022

(65) Prior Publication Data

US 2024/0010538 A1 Jan. 11, 2024

(51) Int. Cl.
| | |
|---|---|
| *C03B 3/00* | (2006.01) |
| *B22D 1/00* | (2006.01) |
| *C03B 3/02* | (2006.01) |

(52) U.S. Cl.
CPC .............. *C03B 3/005* (2013.01); *B22D 1/00* (2013.01); *C03B 3/02* (2013.01)

(58) Field of Classification Search
None
See application file for complete search history.

(56) References Cited

U.S. PATENT DOCUMENTS

| | | | |
|---|---|---|---|
| 1,761,229 A | 6/1930 | Pedersen | |
| 1,834,631 A * | 12/1931 | Mulholland | C03B 3/02 |
| | | | 432/13 |

| | | | |
|---|---|---|---|
| 1,906,695 A * | 5/1933 | Lufkin | C03B 5/26 |
| | | | 65/342 |
| 1,999,761 A * | 4/1935 | Howard | C03B 3/00 |
| | | | 432/248 |
| 2,294,373 A | 9/1942 | Batchell | |
| 2,479,805 A * | 8/1949 | Batchell | C03B 3/00 |
| | | | 65/347 |

(Continued)

FOREIGN PATENT DOCUMENTS

| | | | | |
|---|---|---|---|---|
| CN | 203065333 U | * | 7/2013 | ............. C03B 3/005 |
| CN | 111995224 A | | 11/2020 | |

(Continued)

OTHER PUBLICATIONS

PCT Search Report and Written Opinion, PCT/US2023/027420, Int. Filing Date: Jul. 11, 2023, Applicant: Owens-Brockway Glass Container Inc., Mailed: Oct. 9, 2023.

(Continued)

*Primary Examiner* — Jodi C Franklin

(57) ABSTRACT

A feedstock charger includes a charger conduit and a feedstock conveyor rotatably and translatably carried in the charger conduit. According to a method of using the feedstock charger, feedstock is supplied to the feedstock conveyor of the feedstock charger, feedstock is allowed to fall through the charger conduit and out of an outlet of the charger conduit, and the feedstock conveyor is rotated and linearly advanced in the charger conduit. Also, a disclosed system includes the feedstock charger is coupled to a submerged combustion melter wherein the charger conduit extends into the melter through a feedstock inlet of the melter.

27 Claims, 17 Drawing Sheets

(56) References Cited

U.S. PATENT DOCUMENTS

| | | | |
|---|---|---|---|
| 3,442,633 | A | 5/1969 | Perry |
| 3,486,882 | A | 12/1969 | Raguin et al. |
| 3,592,151 | A | 7/1971 | Webber et al. |
| 3,764,287 | A | 10/1973 | Brocious |
| 4,208,201 | A | 6/1980 | Rueck |
| 4,277,277 | A | 7/1981 | Propster |
| 4,545,800 | A | 10/1985 | Won et al. |
| 4,632,687 | A | 12/1986 | Kunkle et al. |
| 4,652,289 | A * | 3/1987 | Drouet .................... F27D 17/20 |
| | | | 422/903 |
| 4,877,449 | A | 10/1989 | Khinkis |
| 5,218,617 | A * | 6/1993 | Herrera-Garcia ......... F27D 3/08 |
| | | | 266/200 |
| 5,301,620 | A | 4/1994 | Nagel et al. |
| 5,352,258 | A * | 10/1994 | DeGreve .................... C03B 3/00 |
| | | | 65/135.9 |
| 5,630,369 | A | 5/1997 | Edlinger |
| 5,785,940 | A | 7/1998 | Carroll et al. |
| 6,349,570 | B1 | 2/2002 | Coates et al. |
| 6,776,011 | B2 | 8/2004 | Hayes et al. |
| 7,273,583 | B2 | 9/2007 | Rue et al. |
| 7,735,338 | B2 | 6/2010 | Mueller et al. |
| 8,196,432 | B2 | 6/2012 | Jacques et al. |
| 8,573,006 | B2 * | 11/2013 | Macleod .................... C03B 3/00 |
| | | | 65/335 |
| 8,573,007 | B2 | 11/2013 | Sakamoto et al. |
| 8,650,914 | B2 | 2/2014 | Charbonneau |
| 8,661,852 | B2 | 3/2014 | Leister et al. |
| 8,707,738 | B2 | 4/2014 | Sakamoto et al. |
| 8,783,068 | B2 | 7/2014 | Macleod et al. |
| 9,394,192 | B2 | 7/2016 | Villeroy De Galhau et al. |
| 9,643,869 | B2 | 5/2017 | Shock et al. |
| 9,776,901 | B2 | 10/2017 | Huber et al. |
| 9,815,726 | B2 | 11/2017 | Huber |
| 10,196,294 | B2 | 2/2019 | Faulkinbury |
| 10,233,105 | B2 | 3/2019 | Faulkinbury et al. |
| 10,322,960 | B2 | 6/2019 | Martin et al. |
| 10,337,732 | B2 | 7/2019 | Faulkinbury et al. |
| 11,084,749 | B2 | 8/2021 | Rashley et al. |
| 11,787,722 | B2 * | 10/2023 | Guillet ...................... F27D 3/08 |
| | | | 65/29.11 |
| 2004/0065115 | A1 | 4/2004 | Mueller et al. |
| 2006/0122450 | A1 | 6/2006 | Kim et al. |
| 2008/0276652 | A1 | 11/2008 | Bauer et al. |
| 2009/0158777 | A1 * | 6/2009 | Tenzler .................... C03B 5/005 |
| | | | 65/157 |
| 2009/0176639 | A1 | 7/2009 | Jacques et al. |
| 2009/0235695 | A1 | 9/2009 | Pierrot et al. |
| 2011/0236846 | A1 | 9/2011 | Rue et al. |
| 2012/0070252 | A1 * | 3/2012 | Waltert .................... C03B 3/005 |
| | | | 414/804 |
| 2012/0077135 | A1 | 3/2012 | Charbonneau |
| 2013/0086950 | A1 | 4/2013 | Huber et al. |
| 2014/0007622 | A1 * | 1/2014 | Shock ...................... C03B 5/20 |
| | | | 65/335 |
| 2014/0007623 | A1 | 1/2014 | Charbonneau et al. |
| 2014/0090423 | A1 | 4/2014 | Charbonneau et al. |
| 2014/0090424 | A1 | 4/2014 | Charbonneau et al. |
| 2014/0144185 | A1 | 5/2014 | Shock et al. |
| 2015/0013386 | A1 * | 1/2015 | Villeroy De Galhau .................... |
| | | | C03B 5/2353 |
| | | | 65/335 |
| 2015/0307382 | A1 * | 10/2015 | Wang ...................... C03B 3/026 |
| | | | 65/335 |
| 2017/0007622 | A1 | 1/2017 | Giliyar et al. |
| 2018/0002213 | A1 * | 1/2018 | Demott ................. F27D 3/0033 |
| 2018/0029917 | A1 * | 2/2018 | Wang ...................... C03B 3/005 |
| 2018/0354836 | A1 * | 12/2018 | Hansen ................... C03B 3/005 |
| 2019/0161376 | A1 | 5/2019 | Faulkinbury et al. |
| 2019/0161377 | A1 | 5/2019 | Cowles et al. |
| 2019/0263701 | A1 * | 8/2019 | Shock ..................... C03B 5/183 |
| 2019/0264912 | A1 | 8/2019 | Faulkinbury et al. |
| 2020/0156978 | A1 | 5/2020 | Rashley et al. |
| 2020/0156979 | A1 * | 5/2020 | Rashley .................... C03B 3/00 |
| 2020/0290912 | A1 * | 9/2020 | Guillet .................... C03B 3/00 |
| 2021/0009457 | A1 * | 1/2021 | Rashley ................... C03B 5/44 |
| 2021/0094863 | A1 * | 4/2021 | Rashley ................... C03B 5/44 |
| 2021/0122658 | A1 * | 4/2021 | Hasegawa ................ C03B 5/16 |
| 2022/0098076 | A1 | 3/2022 | Holmes et al. |
| 2022/0388884 | A1 | 12/2022 | Weil et al. |
| 2022/0411306 | A1 * | 12/2022 | Bastarrachea ........... C03B 3/00 |
| 2023/0059556 | A1 * | 2/2023 | Guillet ................. C03B 37/022 |
| 2023/0278904 | A1 * | 9/2023 | Alexander ............... C03B 1/00 |
| | | | 65/29.16 |
| 2024/0092673 | A1 * | 3/2024 | Guillet .................... C03B 5/005 |

FOREIGN PATENT DOCUMENTS

| | | | | |
|---|---|---|---|---|
| FR | 3074165 | A1 * | 5/2019 | .............. C03B 3/00 |
| GB | 656566 | | 8/1951 | |
| GB | 857904 | A | 1/1961 | |
| JP | 2005154165 | A * | 6/2005 | ............ C03B 3/005 |
| JP | 2017065965 | A1 | 4/2017 | |
| JP | 6792810 | B2 | 11/2020 | |
| KR | 20010014001 | A | 2/2001 | |
| PL | 2072474 | T3 * | 9/2011 | ............ C03B 3/005 |
| RU | 2059573 | C1 * | 5/1996 | ............ C03B 3/005 |
| RU | 2198854 | C2 * | 2/2003 | ............ C03B 3/005 |
| SU | 1377246 | A1 * | 2/1988 | ............ C03B 3/005 |
| WO | WO-2010146922 | A1 * | 12/2010 | .............. C03B 3/00 |
| WO | 2022072670 | A1 | 4/2022 | |
| WO | 2022072893 | A1 | 4/2022 | |
| WO | 2022072893 | A9 | 4/2022 | |
| WO | 2022072904 | A2 | 4/2022 | |
| WO | WO2022072405 | A1 | 4/2022 | |
| WO | 2022157608 | A1 | 7/2022 | |

OTHER PUBLICATIONS

Informe Pericial (Expert Report), Application No. 202403885, Applicant: Owens-Brockway Glass Container Inc., Dated: Dec. 29, 2025.

Informe De Busqueda (Search Report), Application No. 202403885, Applicant: Owens-Brockway Glass Container Inc., Dated: Dec. 29, 2025.

* cited by examiner

74

124
124a
120
128
130
122a
122
126

124
124a
74
120
128
19 19
130
126
122a
122

74
128
120
124
128
130

MELTING FURNACES AND CHARGING OF MELTING FURNACES

TECHNICAL FIELD

This patent application discloses innovations to material melting systems and, more particularly, charging of feedstock into melting vessels.

BACKGROUND

Material melting systems include feedstock chargers, and melting furnaces having vessels to receive feedstock from the feedstock chargers and hold molten material and also having burners, electrodes, or other heating devices to melt the feedstock into the molten material. Such melting furnaces are used to melt metal, waste material, glass, and various other materials. In glass manufacturing, raw glass materials are used to form a uniform composition of molten glass that can be subsequently processed into glass objects. The raw glass materials can include a variety of different chemical compositions (e.g., various oxides to form soda-lime-silica glass), and can be mixed with recycled glass ("cullet"). The raw glass materials and/or the cullet constitute feedstock or glass batch, which is typically delivered into a glass melting furnace by a glass batch charger, which receives loose glass batch from upstream equipment and then transmits the loose glass batch into the furnace. For example, in a large glass melting furnace, a batch charger positioned at a side of the furnace feeds piles of loose glass batch onto an exposed surface of molten glass in a furnace melter section, and the piles slowly drift away from the charger and submerge into the molten glass. In another example, involving a submerged combustion melting ("SCM") furnace, a batch charger positioned at a lower side of the furnace continuously screw feeds loose glass batch beneath a free surface of molten glass and, thereafter, the batch melts and may rise within a melting section of the furnace. Although such batch chargers are acceptable, challenges to batch charging remain.

BRIEF SUMMARY OF THE DISCLOSURE

The present disclosure embodies a number of aspects that can be implemented separately from or in combination with each other.

In accordance with an embodiment of a feedstock charger, the feedstock charger includes a charger conduit extending along a longitudinal charger axis, and including an inlet to receive feedstock into the charger conduit, and an outlet to transmit feedstock out of the charger conduit. The feedstock charger also includes a feedstock mover cooperative with the charger conduit to move feedstock in a direction from the inlet toward the outlet and including a feedstock conveyor carried in the charger conduit, and at least one actuator coupled to the feedstock conveyor and configured to rotate the feedstock conveyor about the longitudinal charger axis and linearly translate the feedstock conveyor along the longitudinal charger axis.

In accordance with an embodiment of a system for producing molten material, the system comprises a submerged combustion melter including a melting tank and a charging alcove appended to the melting tank of the melter. The melting tank defines a reaction chamber and includes a floor, a roof, and at least one surrounding wall extending between the floor and the roof, a feedstock inlet for introducing a vitrifiable feedstock into the reaction chamber, a molten material outlet for discharging unrefined molten material from the reaction chamber, and one or more submerged combustion burners. The charging alcove includes an alcove floor, an alcove cover at a lower elevation than the melting tank roof and including the feedstock inlet, at least one alcove surrounding wall extending between the alcove floor and the alcove cover, and an alcove interior in open communication with the reaction chamber. The system also comprises a feedstock charger extending along a feedstock charger longitudinal axis and being configured to charge feedstock into the alcove interior of the submerged combustion melter through the feedstock inlet of the alcove cover, wherein the feedstock charger includes a charger conduit extending into the alcove through the feedstock inlet and having a downstream end configured to be submerged below a free surface of molten material in the alcove and a feedstock conveyor extending into the charger conduit and having a downstream end configured to be recessed with respect to the downstream end of the charger conduit.

In accordance with an embodiment of a method of using a feedstock charger, the method comprises: supplying feedstock to a feedstock charger including a charger conduit and a feedstock conveyor carried in the charger conduit; conveying the feedstock to the feedstock conveyor of the feedstock charger; allowing the feedstock to fall through the charger conduit and out of an outlet of the charger conduit; rotating the feedstock conveyor in the charger conduit; and linearly advancing the feedstock conveyor in the charger conduit.

DETAILED DESCRIPTION

Figure 1:
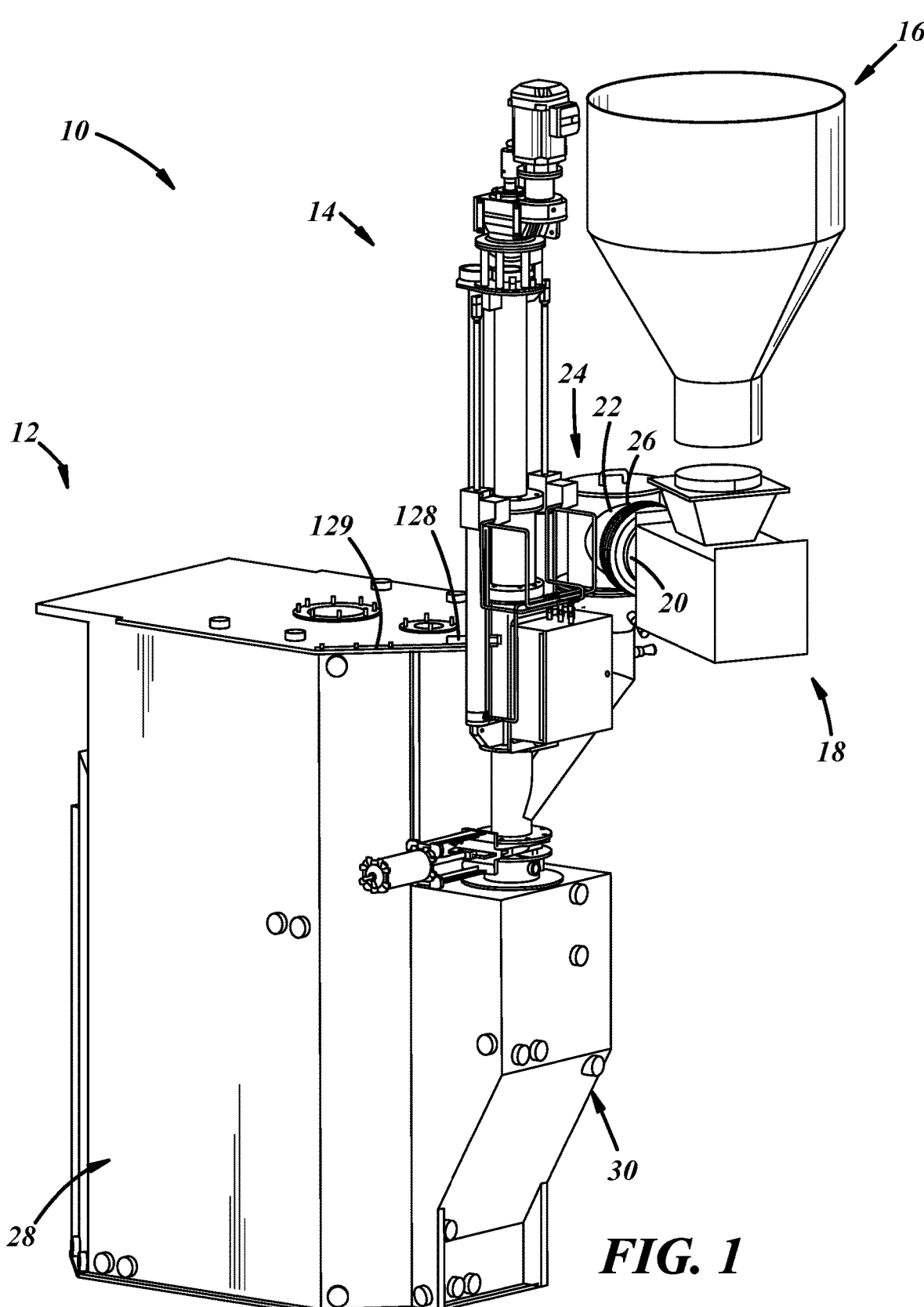
FIG. 1 is a perspective view of a material melting system including a melter having a feeding alcove, and a feedstock charger that may be used to charge feedstock into the feeding alcove of the melter, in accordance with an illustrative embodiment of the present disclosure.

Several example embodiments will be described below with reference to use in a glass manufacturing environment. However, it will be appreciated as the description proceeds that the presently disclosed subject matter is useful in many different applications and may be implemented in many other embodiments.

Submerged combustion melting (SCM) can be used to melt glass feedstock into molten glass. In contrast to prevailing glass melting technology in which molten glass is heated primarily with radiant heat from overhead burners, SCM involves injecting a combustible air-fuel or oxygen-fuel mixture directly into a pool of molten glass from submerged combustion burners. The combustible gas mixture autoignites and resultant combustion products are discharged through the molten glass, causing a high-heat transfer rate and turbulent mixing of the molten glass. A typical submerged combustion melter has a fluid cooled bottom wall with a metal outer surface, a refractory inner surface establishing a floor of the furnace, and a burner extending through the bottom wall and being submerged in the molten glass. The glass feedstock may include glassmaking raw materials including soda ash, limestone, and silica, and/or cullet obtained from recycled glass products, rejected glassware, or the like. In any event, glass feedstock is typically charged into a melter through a roof or a sidewall of the melter.

For example, with prevailing batch charging technology for SCM, glass batch materials are charged into a gas phase, or a gas atmosphere, above a free surface of molten glass within the melter, as opposed to being charged directly into the molten glass. It remains a challenge with SCM to engulf the raw glass materials and/or the cullet into the molten glass without causing dust and batch particulate carryover, due to charging the potentially partially dry materials into the melter in the turbulent gas phase. These particulates are typically filtered out with the use of bagging processes, and particulate control equipment, which is often large in size and expensive to obtain and operate. Adding water to wet the batch helps to limit the carryover, but increases the cost of operation, maintenance, and energy use. And adding a baffle between a charger inlet and an exhaust outlet also may help limit carryover, but such baffles may adversely affect melter performance, may require excessive maintenance, and/or may have other issues.

In another example, with submerged batch charging technology for SCM, glass batch materials are charged below a free surface of molten glass within the melter. Of course, this approach involves its own challenges, including protecting charging equipment from premature wear from contact with molten glass, preventing clogging of batch, and/or minimizing cold spots in the melter structure.

In accordance with one aspect of the present disclosure, a molten material production system and a feedstock charger for a submerged combustion melter are provided and may address one or more challenges, including reducing risk of dust and batch particulate carryover in furnace exhaust, eliminating batch water addition system/operation, reducing the need for filtration bagging process and particulate control equipment to deal with dust and batch particulate carryover in the furnace exhaust, reducing or eliminating a need for carryover baffles, and/or avoiding premature wear of charging equipment, batch clogging, and/or melter cold spots.

Figure 2:
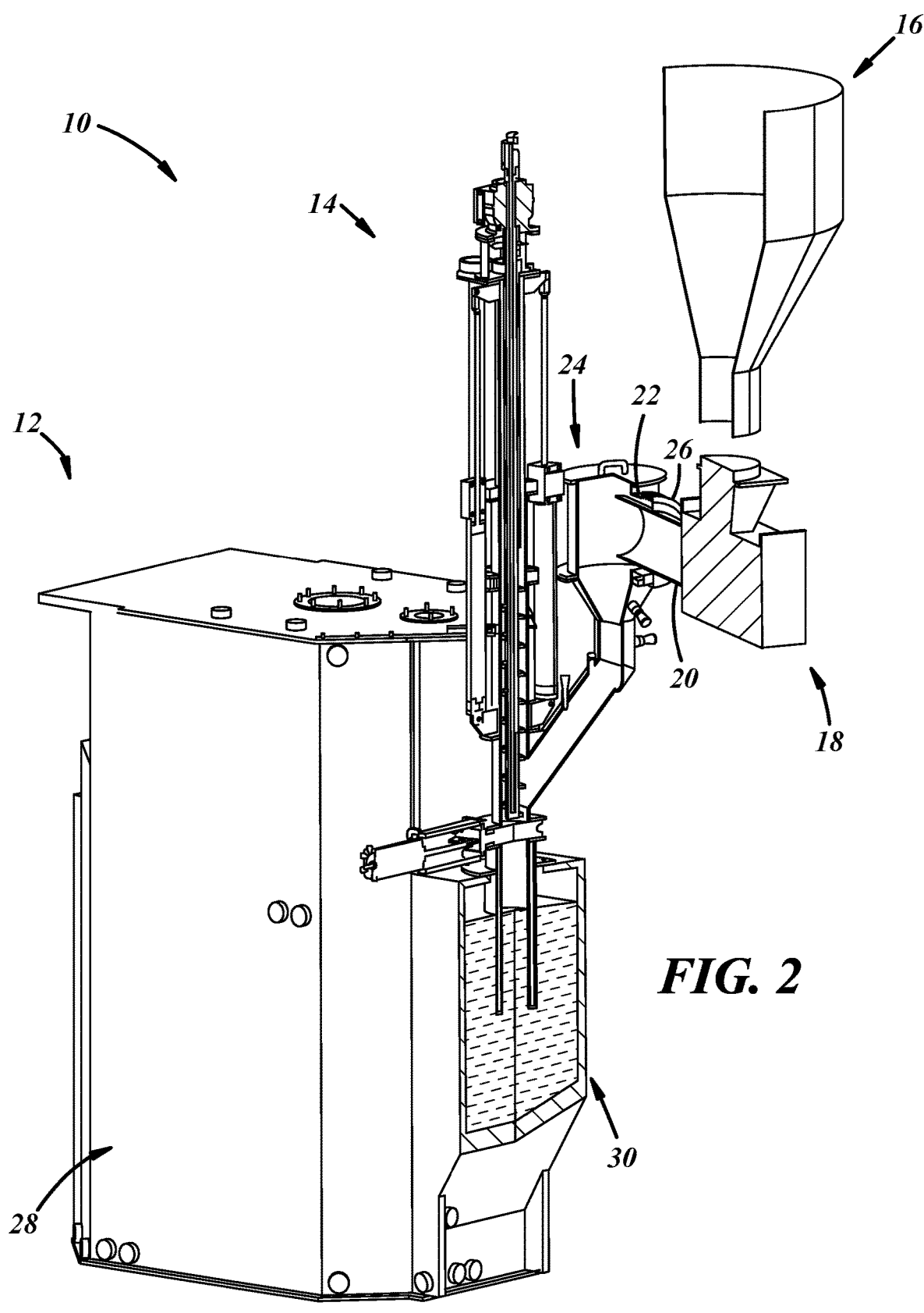
FIG. 2 is a fragmentary longitudinal sectional view a portion of the system of FIG. 1, illustrating a feedstock charger.

With specific reference to the drawing figures, FIGS. 1 and 2 show an illustrative embodiment of a system 10 for producing molten material including a submerged combustion melter 12, and a feedstock charger 14 coupled to the melter 12 to charge feedstock into the melter 12. The system 10 also may include a feedstock funnel 16 to receive feedstock from a feedstock source, for example, a day bin, or the like (not shown) above the funnel 16, and a feedstock meter 18 operatively coupled between the funnel 16 and the feedstock charger 14 to supply feedstock from the funnel 16 to the feedstock charger 14 in metered amounts. The meter 18 may include a rotatable auger, reciprocating plunger, pneumatic conveyor, or any suitable device (not separately shown) for metering feedstock to the feedstock charger 14. The meter 18 may include an outlet conduit 20 that may be inserted into a side inlet 22 of a hopper 24 of the feedstock charger 14 and may be pneumatically sealed thereto via a bellows 26 of the hopper 24.

With reference now to FIGS. 3-6, the melter 12 includes a melting tank 28 that at least partially defines a reaction chamber to melt batch materials into molten glass, a charging alcove 30 that may be appended to the melting tank and that at least partially defines a charging chamber to introduce batch materials therethrough to the melting tank 28. The melter 12 also may include submerged combustion burners 32 (FIG. 6) coupled to the melting tank 28 to supply energy to melt the feedstock into the molten glass, and an exhaust system 34 coupled to the melting tank 28 to carry combustion gases from the burners 32 out of the melting tank 28 for downstream processing.

Figure 3:
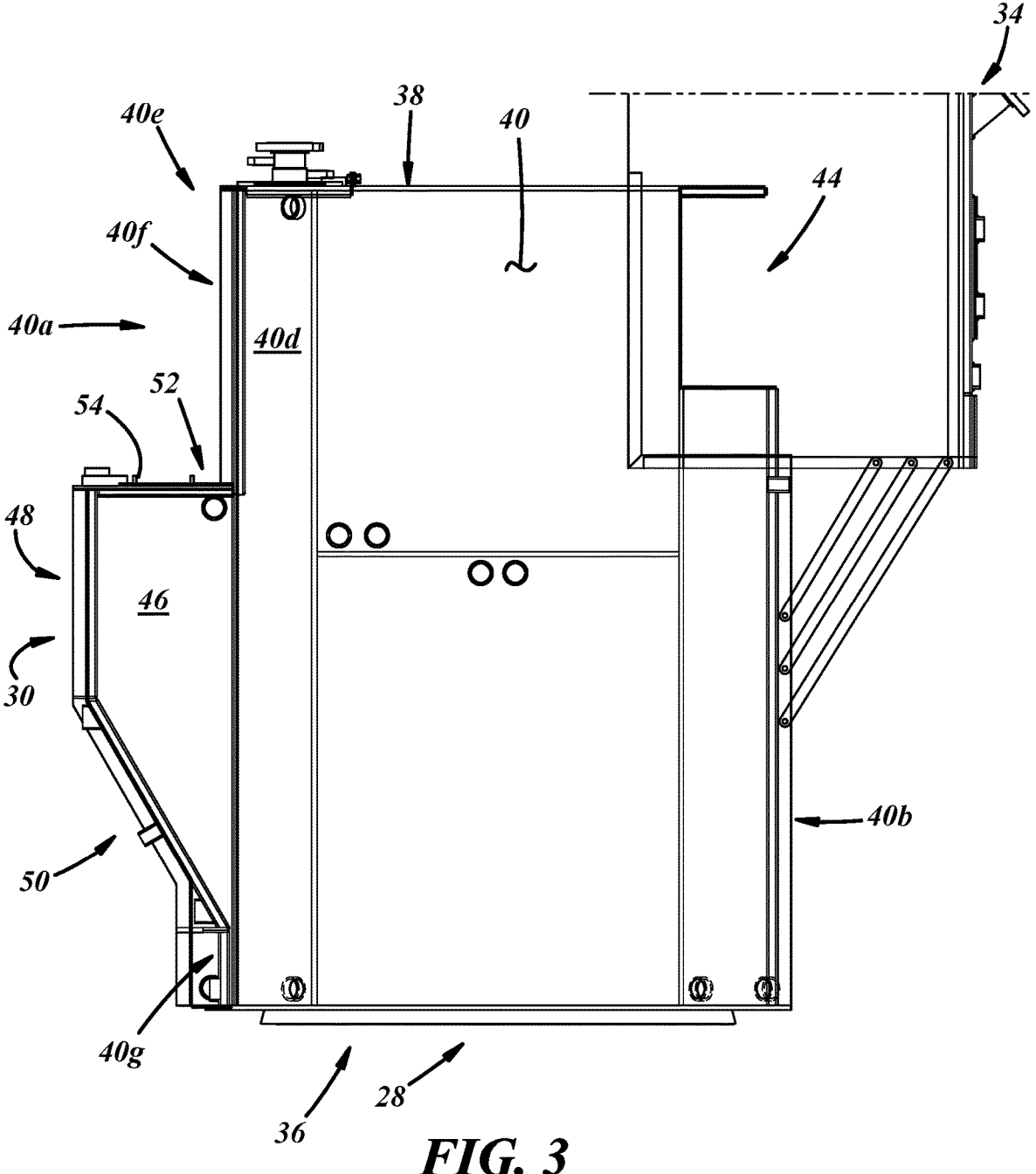
FIG. 3 is a fragmentary side view of the melter of the system of FIG. 1.

With reference to FIG. 3, the melting tank 28 includes a floor 36, a roof 38, and at least one surrounding wall 40 extending between the floor 36 and the roof 38 and that may connect the floor 36 to the roof 38. The at least one surrounding wall 40 may include a front end wall 40a, a rear end wall 40b that opposes and is spaced apart from the front end wall 40a, and two opposed lateral sidewalls 40c that connect the front end wall 40a and the rear end wall 40b. With additional reference to FIGS. 4 and 5, the front end wall 40a may include oblique portions extending from the sidewalls 40c and converging toward one another, and an orthogonal portion 40e (FIG. 3) connecting the oblique portions 40d and that may have upper and lower subportions 40f, 40g (FIG. 3). Together, the floor 36, the roof 38, and the at least one surrounding wall 40 at least partially define the reaction chamber of the melter 12 that holds the glass melt when the melter 12 is operational. Although the shape of the illustrated melter 12 is oblong octagonal in plan view, those of ordinary skill in the art would recognize that the geometry of the melter 12 may take on other shapes/configurations, including, but not limited to cylindrical, ovular, rectangular, or any other shape(s) suitable for melting glass, metal, or other materials. The rear end wall 40*b* may include a molten material outlet 42 (FIG. 6) for discharging unrefined molten material from the reaction chamber of the melting tank 28. Also, in the illustrated embodiment, the rear end wall 40*b* may include an exhaust outlet 44 between an upper end of the rear end wall 40*b* and the roof 38. In other embodiments, the exhaust outlet 44 may be defined as an interruption in the rear end wall 40*b* itself, or as interruptions of both the rear end wall 40*b* and the roof 38, or may be defined through the roof 38 alone.

The floor 36, the roof 38, and/or the at least one surrounding wall 40 of the melting tank 28 may be constructed from one or more fluid cooled panels. Although not necessarily separately illustrated, the fluid cooled panels may include an inner wall and an outer wall that together define an internal cooling space through which a coolant, such as water, refrigerant, or other fluid may be circulated. One or more baffles (not shown) may extend fully or partially between the confronting interior surfaces of the inner and outer walls to direct the flow of the coolant along a desired flowpath. As a result of being fluid cooled, a glass side refractory material layer (not shown) may cover the inner wall of each fluid cooled panel supports, and is covered by, a layer of frozen glass (not shown) that forms in-situ between an outer skin of the glass melt and a surface of the glass-side refractory material layer. This layer of frozen glass, once formed, shields and effectively protects the underlying inner wall from the glass melt. The glass-side refractory material layer may be composed of AZS (i.e., alumina-zirconia-silica), or any other material for use in protecting metal walls of the melter 12.

Figure 4:
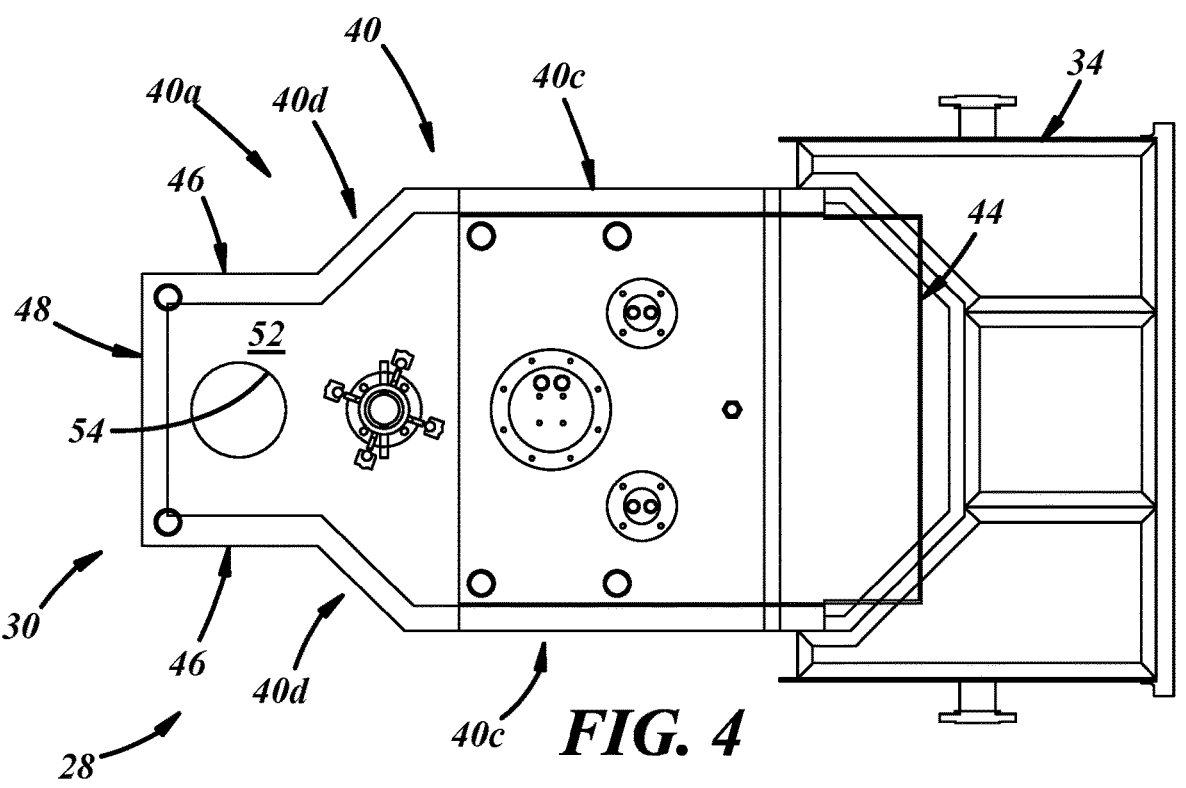
FIG. 4 is a top view of the melter shown in FIG. 3.
Figure 5:
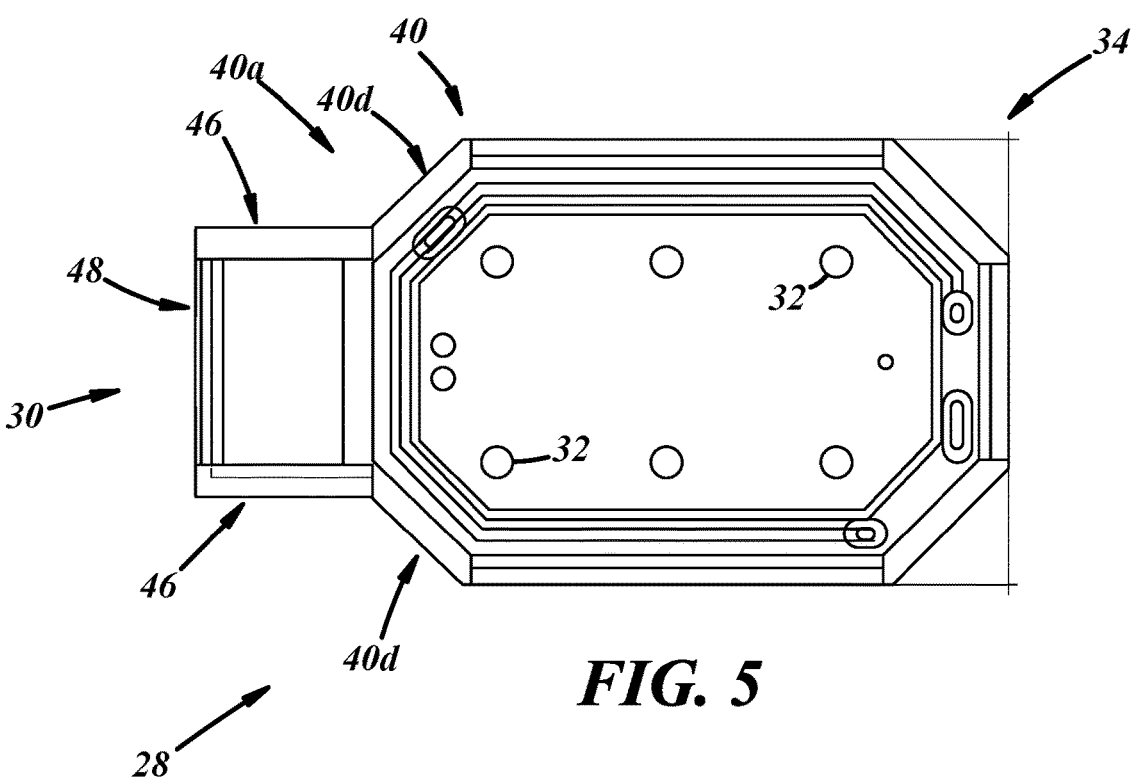
FIG. 5 is a bottom view of the melter shown in FIG. 3.

With continued reference to FIGS. 3-5 generally, the charging alcove 30 at least partially defines the charging chamber in fluid communication with the reaction chamber of the melting tank 28. The charging alcove 30 can be offset from and appended to an upstream end of the melting tank 28, for example, securely attached to the front-end wall 40*a* of the melting tank 28. The charging alcove 30 can allow vitrifiable feedstock to be fed into the melter 12 as close as possible to the glass melt while serving to reduce or prevent carryover of particulate matter into the melter exhaust system 34. The charging alcove 30 can be formed from at least one individual panel that may be separate from the panels of the melting tank 28, and which may be fluid-cooled, and may be detachable, repositionable, and/or reconfigurable by removing, adding, or relocating the at least one individual panel.

For example, the illustrated charging alcove 30 includes alcove sidewalls 46 that may extend orthogonally in a direction upstream from the front end wall 40*a* of the melting tank 28, and an alcove end wall 48 that may extend orthogonally between the sidewalls 46 at an upstream end of the alcove 30. Also as illustrated, the charging alcove 30 may include an alcove bottom wall 50 (FIG. 3) that may extend obliquely upwardly at an angle between 5 and 85 degrees from vertical including all ranges, subranges, values, and endpoints thereof and may be at a higher elevation than the melting tank floor 36, and an alcove cover 52 that may be at a lower elevation than the melting tank roof 38. The alcove sidewalls 46, end wall 48, bottom wall and cover

52 may include at least one fluid-cooled panel and/or one or more panels composed of refractory material, and together define an alcove interior in the form of the charging chamber in open communication with the reaction chamber of the melting tank 28. The cover 52 of the charging alcove 30 can include at least one alcove feedstock inlet 54, for example, an aperture, configured to receive the vitrifiable feedstock therethrough into the charging alcove interior.

Figure 6:
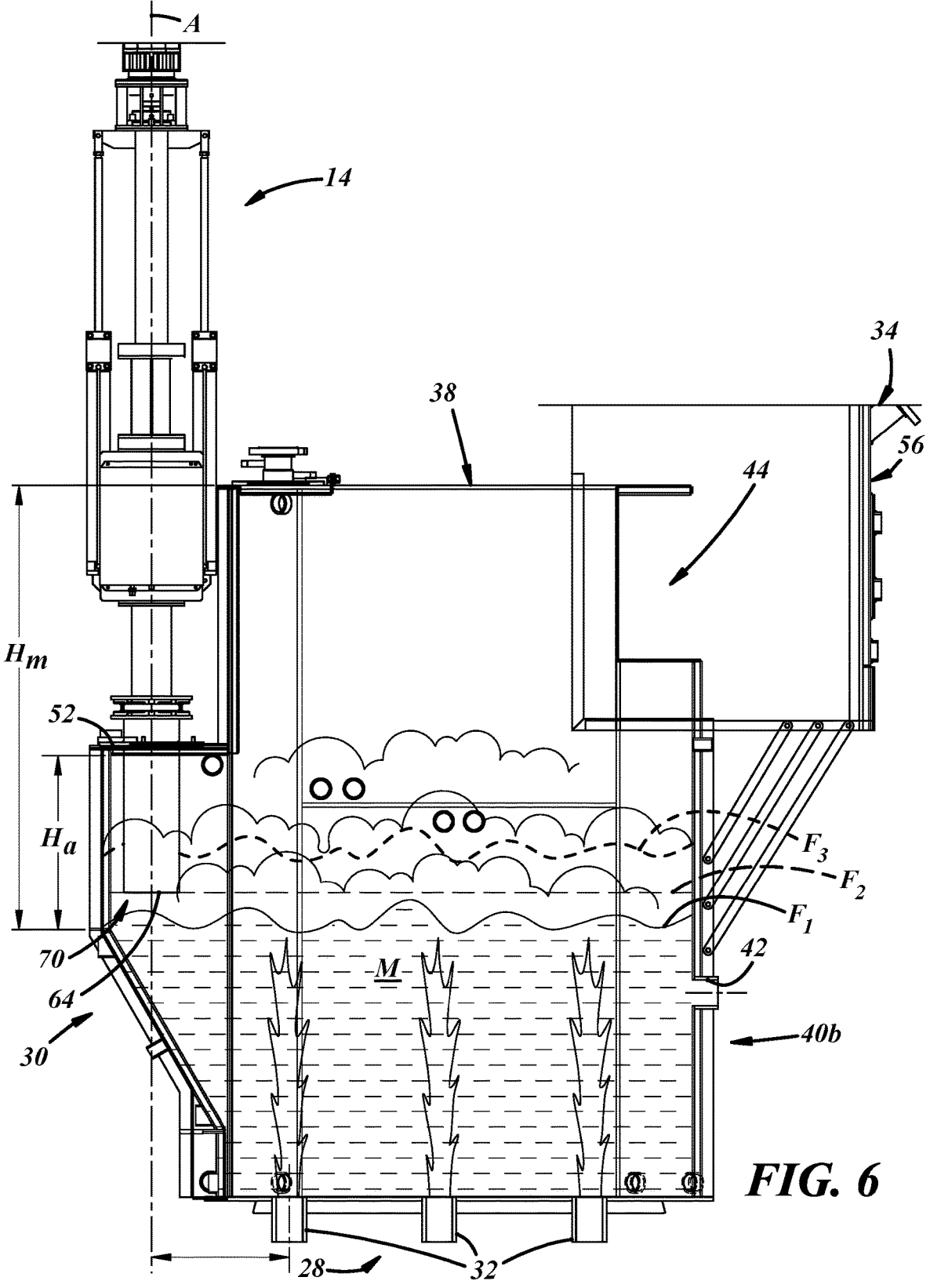
FIG. 6 is a fragmentary longitudinal sectional view of the system of FIG. 1.

With reference to FIG. 6, the interior of the charging alcove 30 can have a head space H a (e.g., a distance from the cover 52 to a free surface of the glass melt M) of the alcove that is shorter than a head space H m (e.g., a distance from the roof 38 to a free surface of the glass melt M) of the melting tank 28, and the charging alcove interior may be smaller in volume than the interior of the melting tank 28. As will become clear from the disclosure below, the presently disclosed system 10 enables feedstock to be supplied to a location below a free surface of molten glass, instead of into a splash zone above the free surface of the molten glass.

Accordingly, during operation of the system 10, the charging alcove head space H a may be predominantly free of vitrifiable feedstock, such that there is little to no carryover of feedstock particulates into the exhaust outlet 44. Notably, the melter 12 need not include a downwardly depending baffle between the feedstock charger 14 and the exhaust outlet 44. In other words, no such baffle is needed downstream of the charger 14.

With continued reference to FIG. 6, the melter's submerged combustion burners 32 may be mounted in corresponding burner ports defined in the floor 36 and/or the surrounding upstanding wall 40 at a portion of the wall 40 that is immersed by the glass melt. Each of the submerged combustion burner(s) 32 forcibly injects a combustible gas mixture of fuel and oxidant into the glass melt through output nozzles of the burners 32. The fuel supplied to the submerged combustion burner(s) 32 is preferably methane or propane, and the oxidant may be pure oxygen or include a high percentage (>80 vol %) of oxygen, in which case the burner(s) 32 are oxy-fuel burners, or it may be air or any oxygen-enriched gas. Upon being injected into the glass melt, the combustible gas mixture autoignites to produce combustion products—namely, $CO_2$, CO, $H_2O$, and any uncombusted fuel, oxygen, and/or other gas compounds such as nitrogen—that are discharged into and through the glass melt. Anywhere from five to thirty submerged combustion burners 32 may be installed in the melter 12, although more or less burners 32 may be employed depending on the size and melt capacity of the melter 12. While the one or more submerged combustion burners 32 are being fired into the glass melt, the vitrifiable feedstock can be controllably introduced and dispersed into the melter interior through the inlet 54. The dispersed vitrifiable feedstock can be subjected to intense heat transfer and rapid particle dissolution throughout the glass melt due to the vigorous melt agitation and shearing forces caused by the submerged combustion burner(s) 32. This causes the vitrifiable feedstock to quickly mix, react, and become chemically integrated into the glass melt.

The exhaust system 32 communicates with the exhaust outlet 44 and is configured to remove gaseous compounds from the reaction chamber of the melting tank 28. The gaseous compounds removed through the exhaust system 32 may be treated, recycled, or otherwise managed away from the melter 12 as needed. The exhaust system 32 may include an exhaust flue 56 that is in fluid communication with the interior of the melting tank 28 and that may be fluid-cooled, and an exhaust hood (not separately shown) that is in fluid communication with the flue 56 and may be refractory lined.

The feedstock charger 14 is configured to charge feedstock into the interior of the alcove 30 of the melter 12 through the feedstock inlet 54 of the alcove cover 52. The feedstock charger 14 extends along a feedstock charger longitudinal axis A and may have flexibility to charge feedstock into the melter 12 either above or below a free surface of molten glass in the melter 12, as will be described in further detail herein below.

Figure 7:
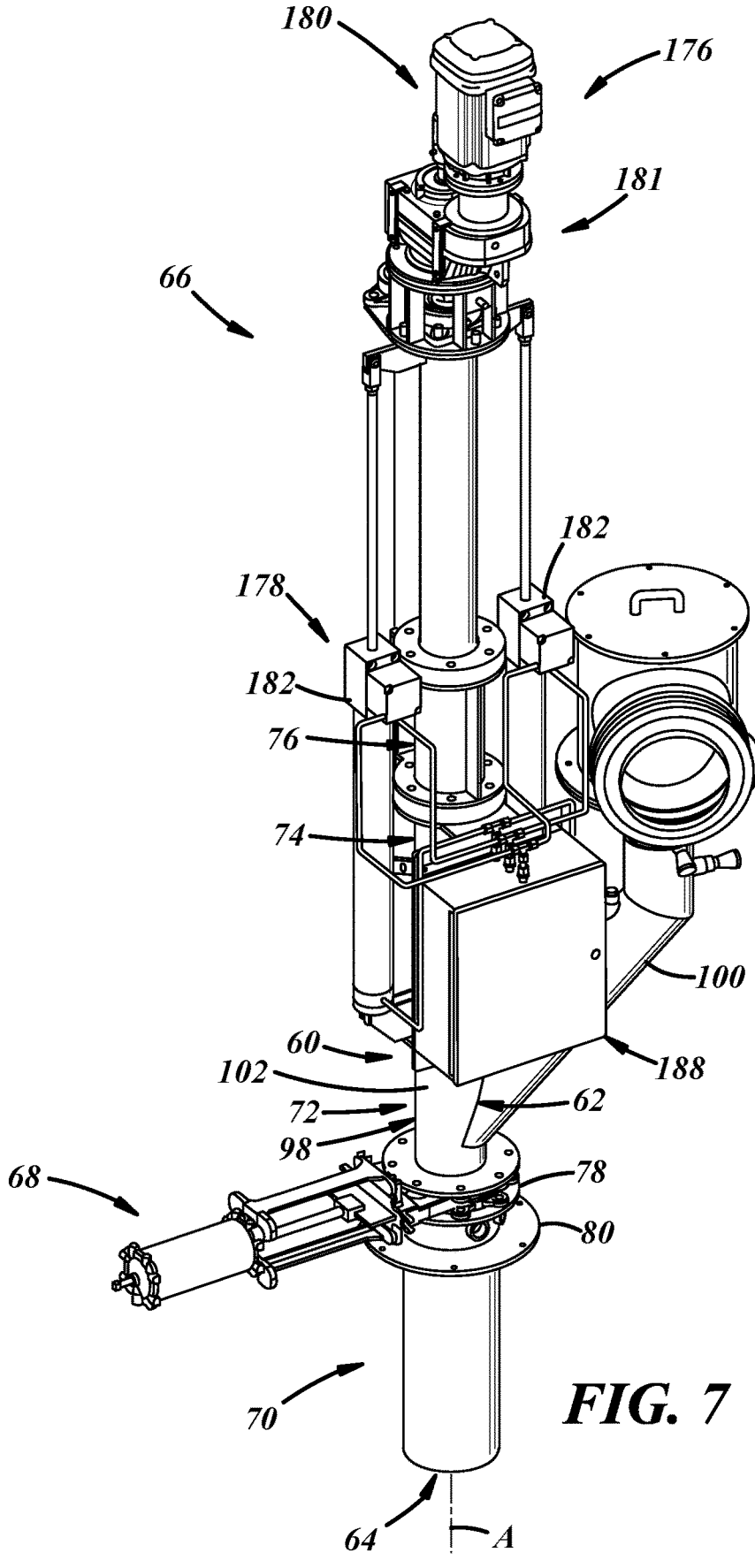
FIG. 7 is a perspective view of the feedstock charger of FIG. 1.
Figure 8:
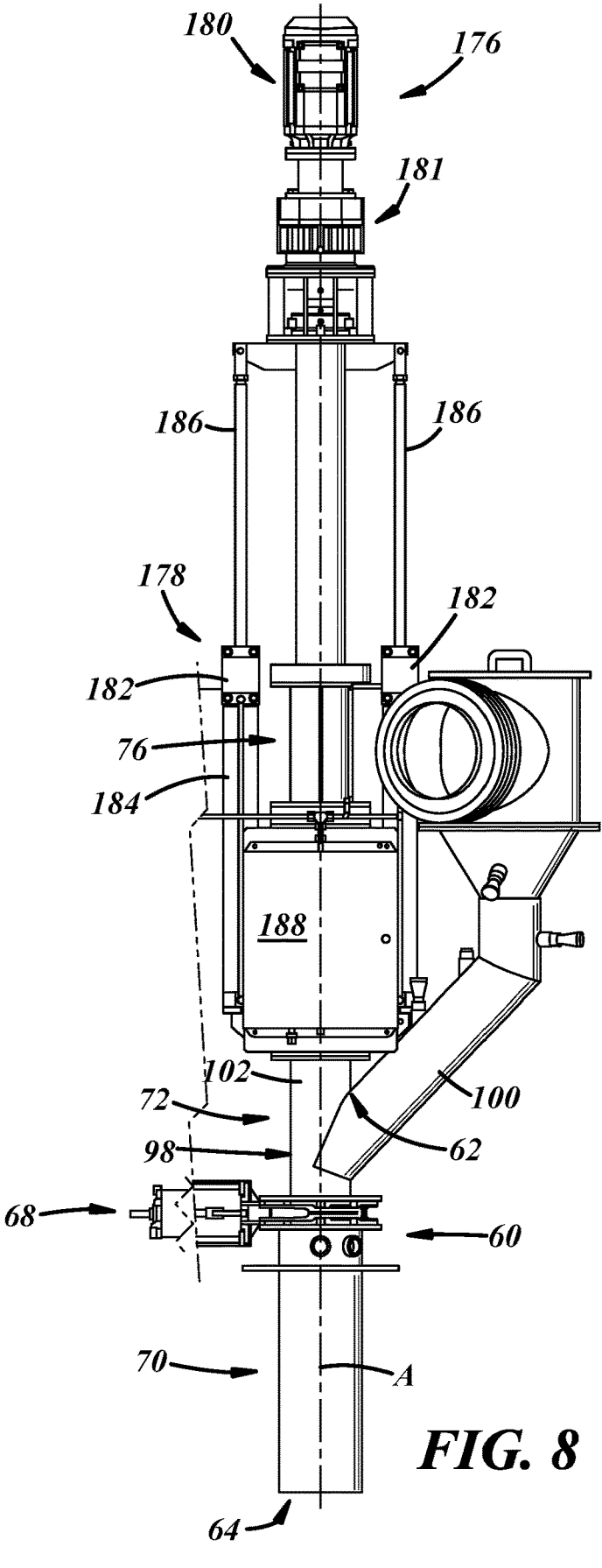
FIG. 8 is an end view of the feedstock charger from FIG. 7.
Figure 9:
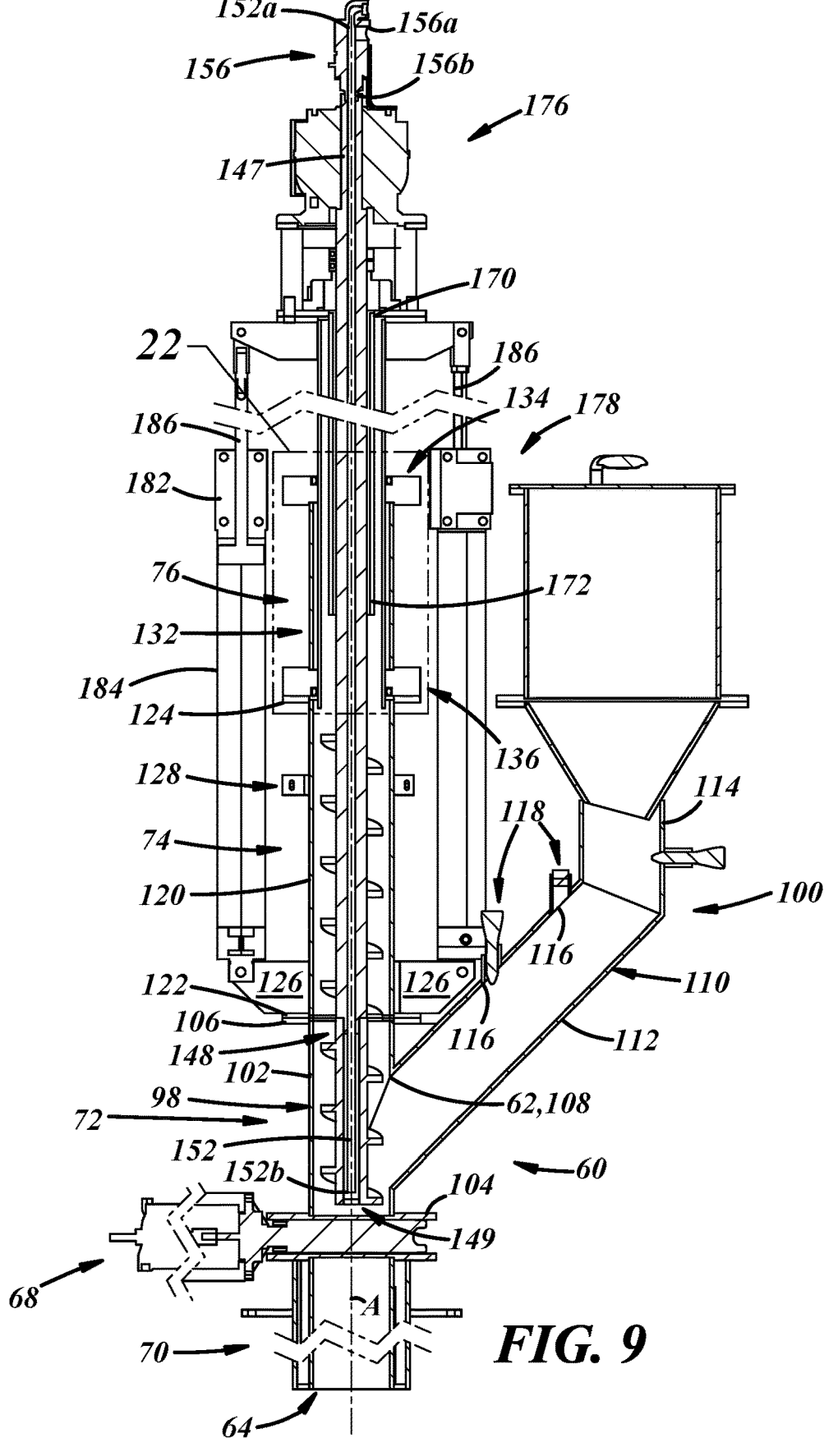
FIG. 9 is a longitudinal sectional view of the feedstock charger from FIG. 8.
Figures 10, 11, 12, 13:
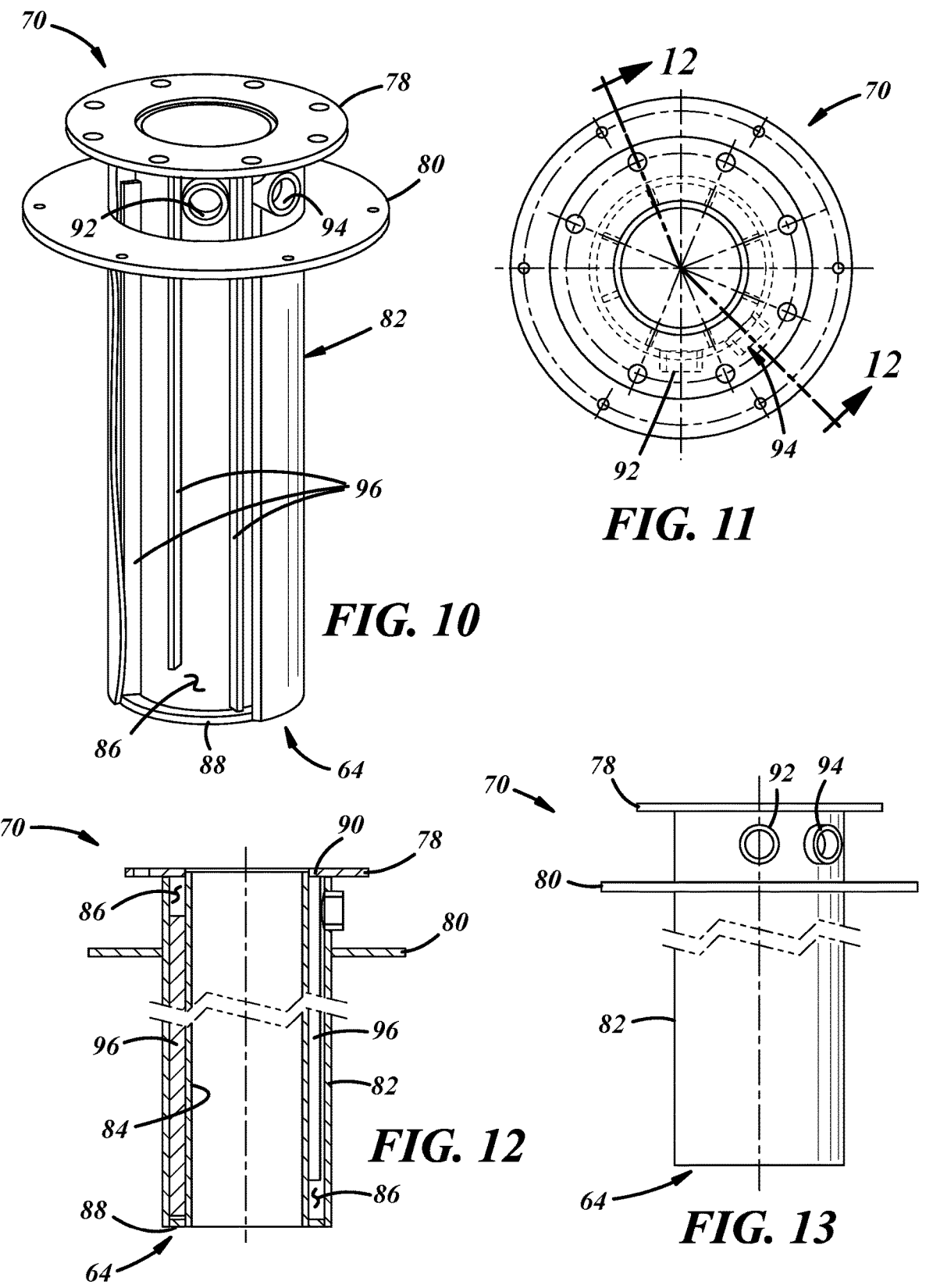
FIG. 10 is a perspective view of a spout of the feedstock charger from FIG. 7.
FIG. 11 is a top view of the spout shown in FIG. 10.
FIG. 12 is a fragmentary longitudinal sectional view of the spout shown in FIG. taken along line 12-12 of FIG. 11.
FIG. 13 is a fragmentary elevational view of the spout shown in FIG. 10.

With reference to FIGS. 7-9 generally, the feedstock charger 14 generally includes a charger conduit 60 extending along the longitudinal charger axis A and including a charger feedstock inlet 62 to receive feedstock into the charger conduit 60 and a charger feedstock outlet 64 to transmit feedstock out of the charger conduit 60. Also, the feedstock charger 14 generally includes a feedstock mover 66 cooperative with the charger conduit 60 to move feedstock in a direction from the inlet 62 toward the outlet 64. Further, the feedstock charger may include a gate 68 intersecting the charger conduit 60 downstream of the inlet 62 and upstream of the outlet 64 to open and close the charger conduit 60, particularly in a manner that restricts back flow of molten glass, feedstock particulates, or the like through the charger conduit 60. As will be described in greater detail herein below, one or more portions of the charger conduit 60 and/or the feedstock mover 66 may be fluid cooled, but the gate 68 is not necessarily fluid cooled.

The charger conduit 60 generally may include a spout 70 establishing the feedstock outlet 64 of the feedstock charger 14, and a charger junction conduit 72 establishing the feedstock inlet 62 of the feedstock charger 14. The charger conduit 60 also may include an actuator mount conduit 74 upstream of and coaxial with the charger junction conduit 72, and a conveyor guide conduit 76 upstream of and coaxial with the actuator mount conduit 74. The charger junction conduit 72, actuator mount conduit 74, and conveyor guide conduit 76 are not necessarily fluid-cooled, but the spout 70 may be fluid-cooled as described below.

With reference to FIGS. 10-13, the spout 70 includes a spout upstream end downstream of the gate 68 (FIGS. 7-9) and having a spout upper mounting flange 78, a spout downstream end constituting the outlet 64 of the feedstock charger 14, and a melter mounting flange 80 between the outlet 64 and the upper mounting flange 78. If fluid-cooled, the spout 70 may include an outer wall 82, an inner wall 84, an annular space 86 between the outer and inner walls 82, 84, downstream and upstream closures 88, 90 that close off the annular space, and coolant inlet and outlet ports 92, 94 proximate an upstream end of the outer wall 82 and extending therethrough in fluid communication with the annular space 86. As used herein, the term "proximate" means relatively closer to one end than to an opposite end. Also, the spout 70 may include a plurality of circumferentially spaced and longitudinally staggered baffles 96 extending radially between and in contact with the outer and inner walls 82, 84 and extending and staggered longitudinally between the downstream and upstream closures 88, 90 to establish a serpentine path along and around the fluid-cooled spout 70 between the inlet and outlet ports 92, 94 thereof.

With reference again to FIG. 6, the spout 70 protrudes into the alcove 30 and, because it may be fluid-cooled, the spout 70 may be submerged below a free surface of molten glass in the alcove 30 and into the molten glass pool in the alcove 30. During operation of the melter 12, the free surface of the molten glass M may be at a minimum level $F_1$, a maximum level $F_3$, an average level $F_2$, and the like. For example, the feedstock outlet 64 or downstream end of the spout 70 may be submerged below the free surface of molten glass when the free surface is at or above the average level $F_2$. More specifically, the feedstock outlet 64 or downstream end of the spout 70 may be persistently submerged in the pool of molten glass during operation of the melter 12 at such levels. In contrast, the feedstock outlet 64 or downstream end of the spout 70 may be spaced above the free surface of molten glass when the level of molten glass in the melter 12 is between the average level $F_2$ and the minimum level $F_1$. But such spacing may not be desirable, particularly when there is no baffle between the feedstock outlet 64 and the exhaust outlet 44. Accordingly, when the melter is operated with a relatively low level of molten glass, such as the minimum level $F_1$, then it may be desirable to replace the spout 70 with a longer spout (not shown) whose length is such that a downstream end thereof would be persistently submerged in the pool of molten glass during system operation. Conversely, when the melter 12 is operated with a relatively high level of molten glass, such as the maximum level $F_3$, then it may be desirable to replace the spout 70 with a shorter spout (not shown) whose length is such that a downstream end thereof would be persistently submerged in the pool of molten glass during system operation, but not so long that molten glass would tend to choke or clog the spout 70. In any case, once the downstream end of the spout 70 becomes submerged in molten glass, the charger 14 controls a flow rate of feedstock into the melter by adjusting operation (e.g., speed and/or position) of the feedstock mover 66 as will be further described herein below.

Figure 15:
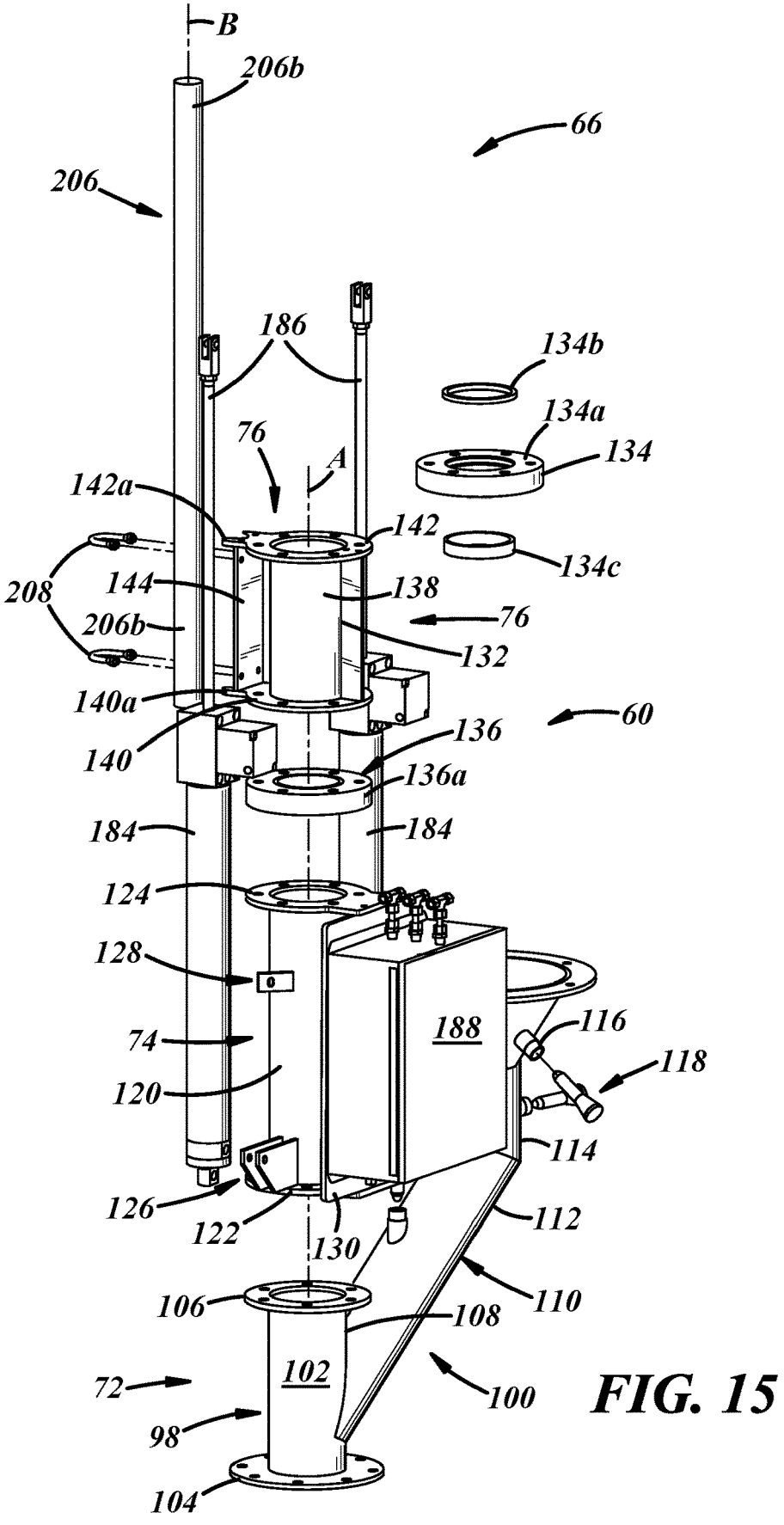
FIG. 15 is an enlarged rotated exploded view of a portion of the feedstock charger from FIG. 14.

With reference to FIGS. 9 and 15, the charger junction conduit 72 includes a feedstock mover portion 98 extending along the longitudinal axis A, and a feedstock inlet or branch portion 100 transversely oriented with respect to the feedstock mover portion 98. The feedstock mover portion 98 has a downstream end that is located upstream of the gate 68 and may be coupled to the gate 68 by welding, fastening, or any other suitable coupling. The feedstock mover portion 98 may include a cylinder 102, a lower mounting flange 104 at a lower end of the cylinder 102 for coupling to the gate 68, an upper mounting flange 106 at an upper end of the cylinder 102 for coupling to another portion of the charger conduit 60, and an inlet 108 in a side of the cylinder 102 and in open communication with the feedstock branch portion 100. The feedstock branch portion 100 may include a branch conduit 110 coupled to the cylinder 102 by fastening, welding, or by any other suitable coupling technique. The branch conduit 110 may include an oblique portion 112 and a vertical portion 114 in downstream communication with the hopper 24 to receive feedstock from the hopper 24 and convey it into the feedstock mover portion 98 of the junction conduit 72.

The branch conduit 110 also may have one or more ports 116 carrying one or more sensors 118 to determine one or more levels of feedstock in the branch conduit 110, and used to regulate operation of the feedstock meter 18 (FIGS. 1-2). In the illustrated embodiment, there are at least three such sensors 118; low level sensor, high level sensor, and shutoff level sensor. The sensors 118 may be capacitive sensors, or any other sensors suitable for use in sensing a level of feedstock, particularly, glassmaking feedstock. In any case, a level of feedstock is maintained within the sloping oblique portion 112, such that the meter 18 is activated to provide feedstock thereto until feedstock trips the high level sensor, at which point the meter 18 may be deactivated until feedstock falls below one or both of the other level sensors. Maintaining a desired range level of feedstock in the branch portion 100 allows the feedstock mover 66 to regulate the amount of feedstock fed into the melter by varying the operation of the feedstock mover 66, for instance, rotational speed and/or linear translation thereof. In contrast, the funnel 16 and the meter 18 are intended merely to follow and keep up with the operation of the feedstock mover 66.

With reference to FIGS. 9, 15, and 17-19, the actuator mount conduit 74 includes a cylinder 120 extending along the longitudinal axis A, a lower mounting flange 122 at a lower end of the cylinder 120 for mounting to the upper flange 106 of the charger junction conduit 72, and an upper mounting flange 124 for mounting to the conveyor guide conduit 76. The actuator mount conduit 74 also includes one or more drive or actuator mounts 128 extending outwardly from the cylinder 120 at a location proximate the lower mounting flange 122, and one or more melter mounts 128 extending outwardly from the cylinder 120 at a location between the actuator mounts 126 and the upper mounting flange 124. With brief reference to FIG. 1, the melter mounts 128 may be coupled to the melter 28, for example, via brackets 129 that may be fastened therebetween and thereto. The brackets 129 may stabilize the charger 14 in a vertical orientation, and against torsional reaction forces if the charger 14 involves rotary actuation of the feedstock mover 66. The actuator mount conduit 74 also may include a controller mounting plate 130 that may be welded, fastened, or otherwise coupled to and between the mounting flanges 122, 124, for example, to mounting protrusions 122a, 124a of the flanges 122, 124.

Figure 20:
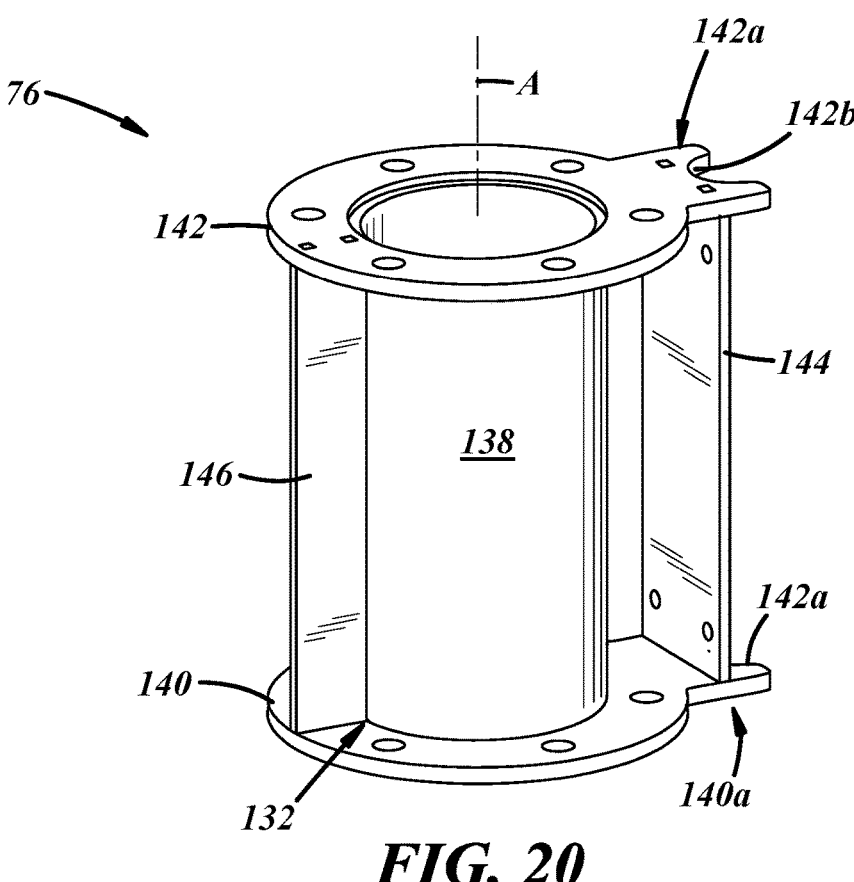
FIG. 20 is a perspective view of a conveyor guide conduit of the feedstock charger from FIG. 7.
Figure 21:
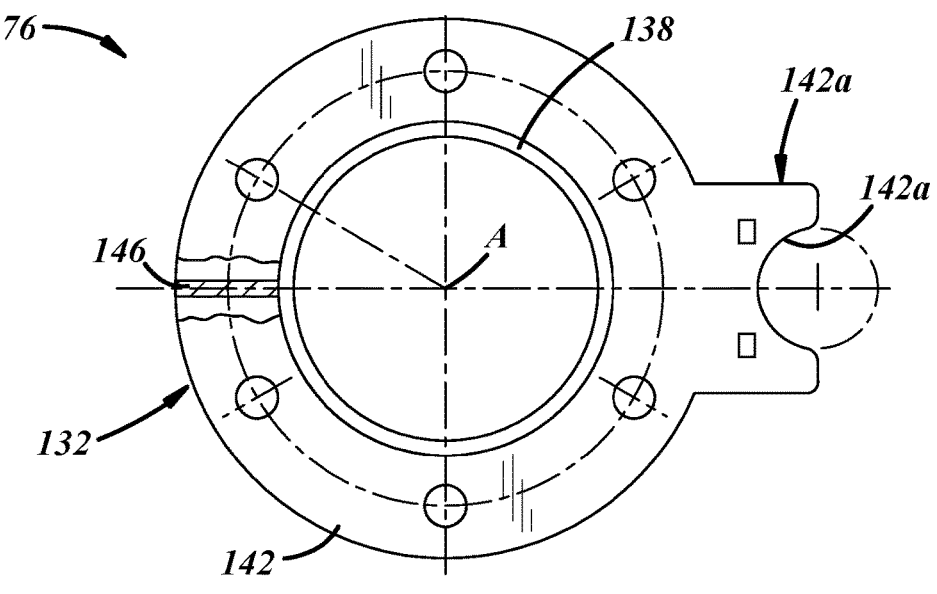
FIG. 21 is a top view of the conveyor guide conduit shown in FIG. 20.

With reference to FIGS. 9, 15, and 20-22 generally, the conveyor guide conduit 76 includes a housing 132, and upper and lower seal and bushing assemblies 134, 136 each including mounting rings 134a, 136a, seal rings 134b, 136b carried by the mounting rings 134a, 136a, and bushings 134c, 136c carried by the mounting rings 134a, 136a. With specific reference to FIGS. 20-22, the housing 132 includes a cylinder 138 extending along the longitudinal axis A, a lower mounting flange 140 for coupling to the upper mounting flange 124 of the actuator mount conduit 74 with the lower seal and bushing assembly 136 sandwiched therebetween, and an upper mounting flange 142 carrying the upper seal and bushing assembly 134. The flanges 124, 140, 142 and assemblies 134, 136 may be welded, fastened via fasteners (not shown) extending through fastener passages, or may otherwise be coupled in any suitable manner. With reference to FIG. 20, the housing 132 may have the mounting flanges 140, 142 provided with alignment rod protrusions 140a, 142a extending outwardly therefrom with semicircular reliefs 140b, 142b, an alignment rod mounting plate 144 extending between and coupled to the alignment rod protrusions 140a, 142a, and one or more gussets 146 between the mounting flanges 140, 142.

Figure 14:
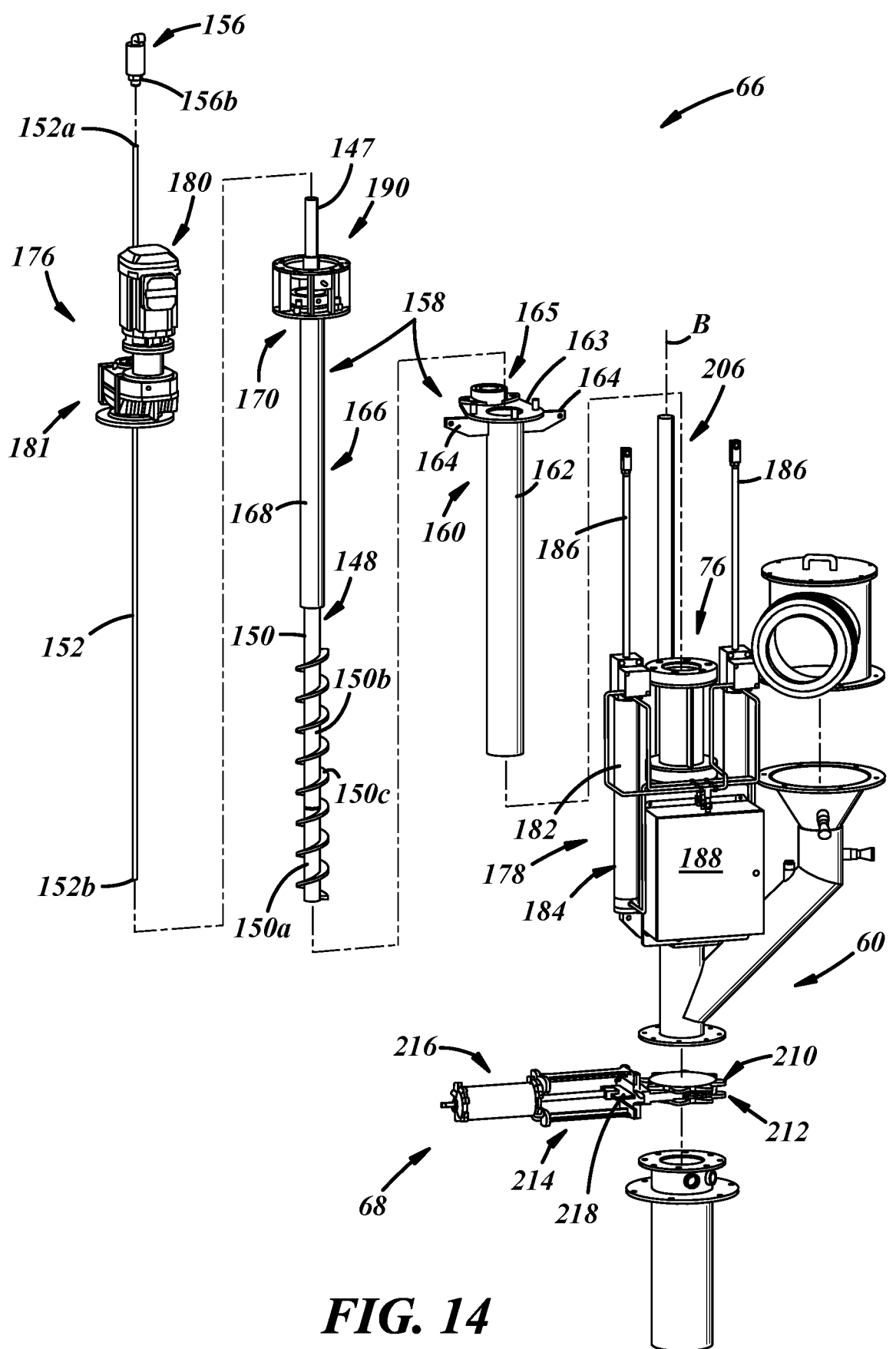
FIG. 14 is an exploded perspective view of the feedstock charger from FIG. 7.
Figure 16:
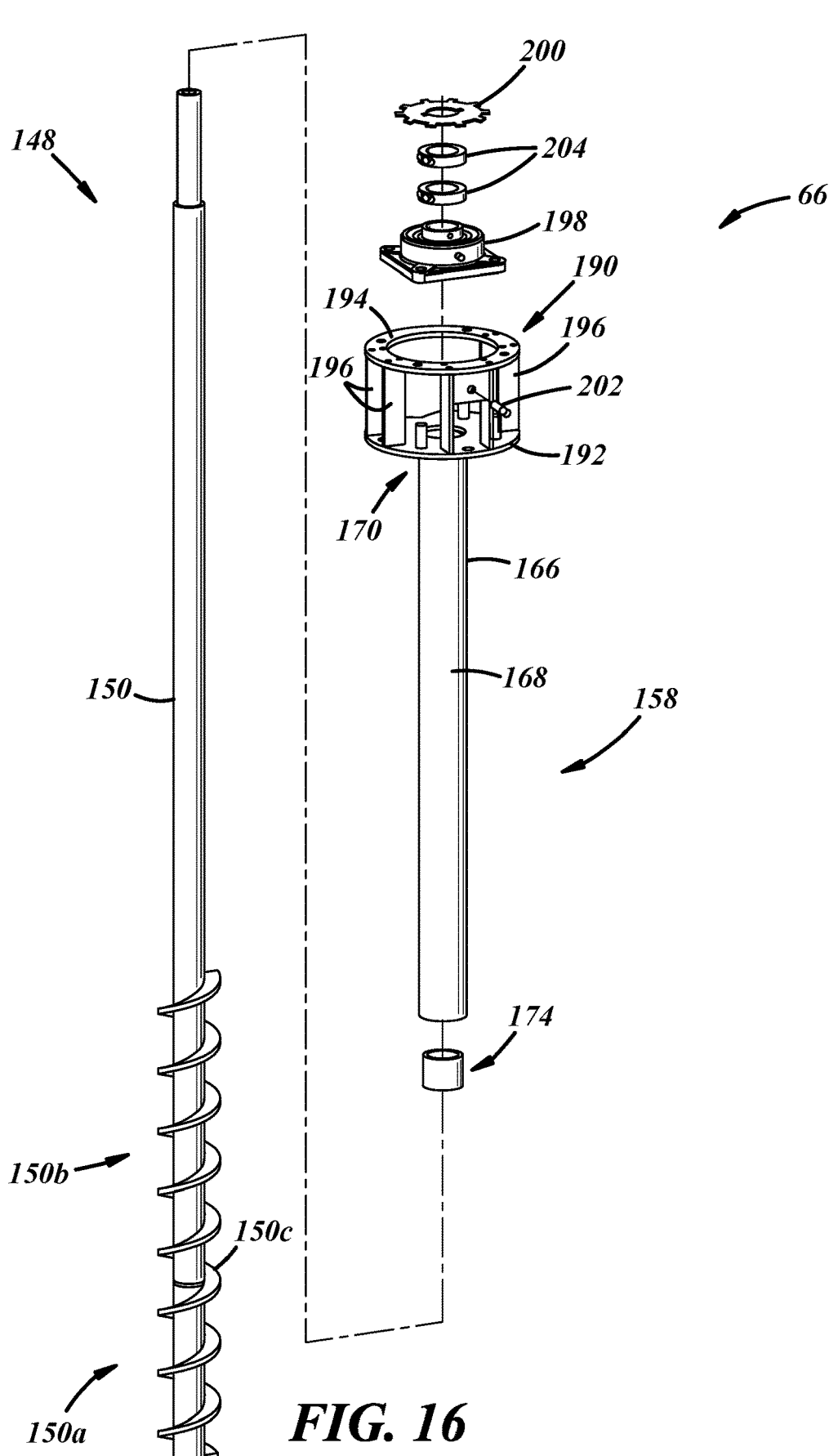
FIG. 16 is an enlarged exploded view of another portion of the feedstock charger from FIG. 14.
Figures 17, 18, 19:
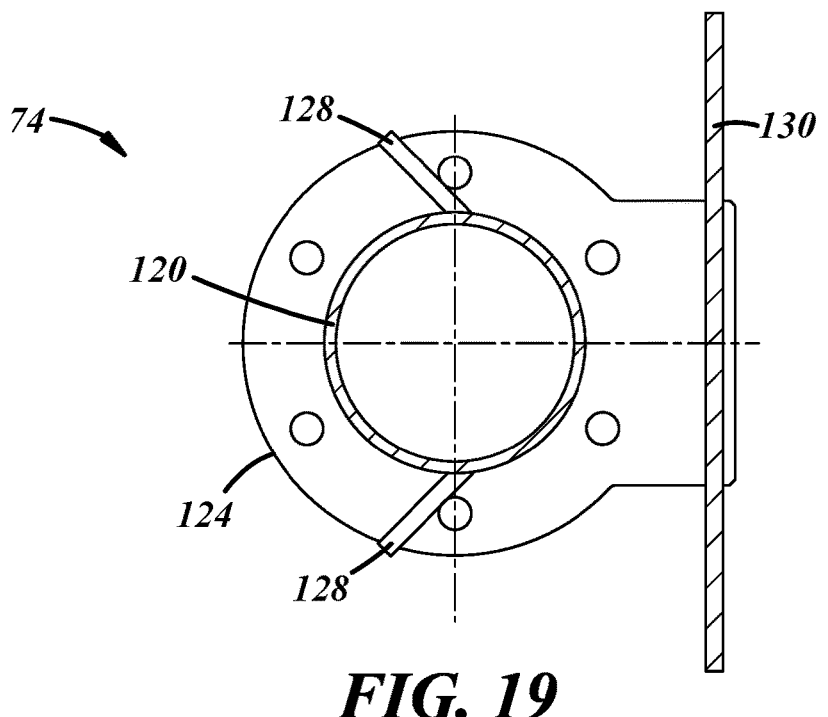
FIG. 17 is a perspective view of an actuator mount conduit of the feedstock charger from FIG. 7.
FIG. 18 is an elevational view of the actuator mount conduit shown in FIG. 17.
FIG. 19 is a transverse sectional view of the actuator mount conduit shown in FIG. 17, taken along line 19-19 of FIG. 18.
Figure 23:
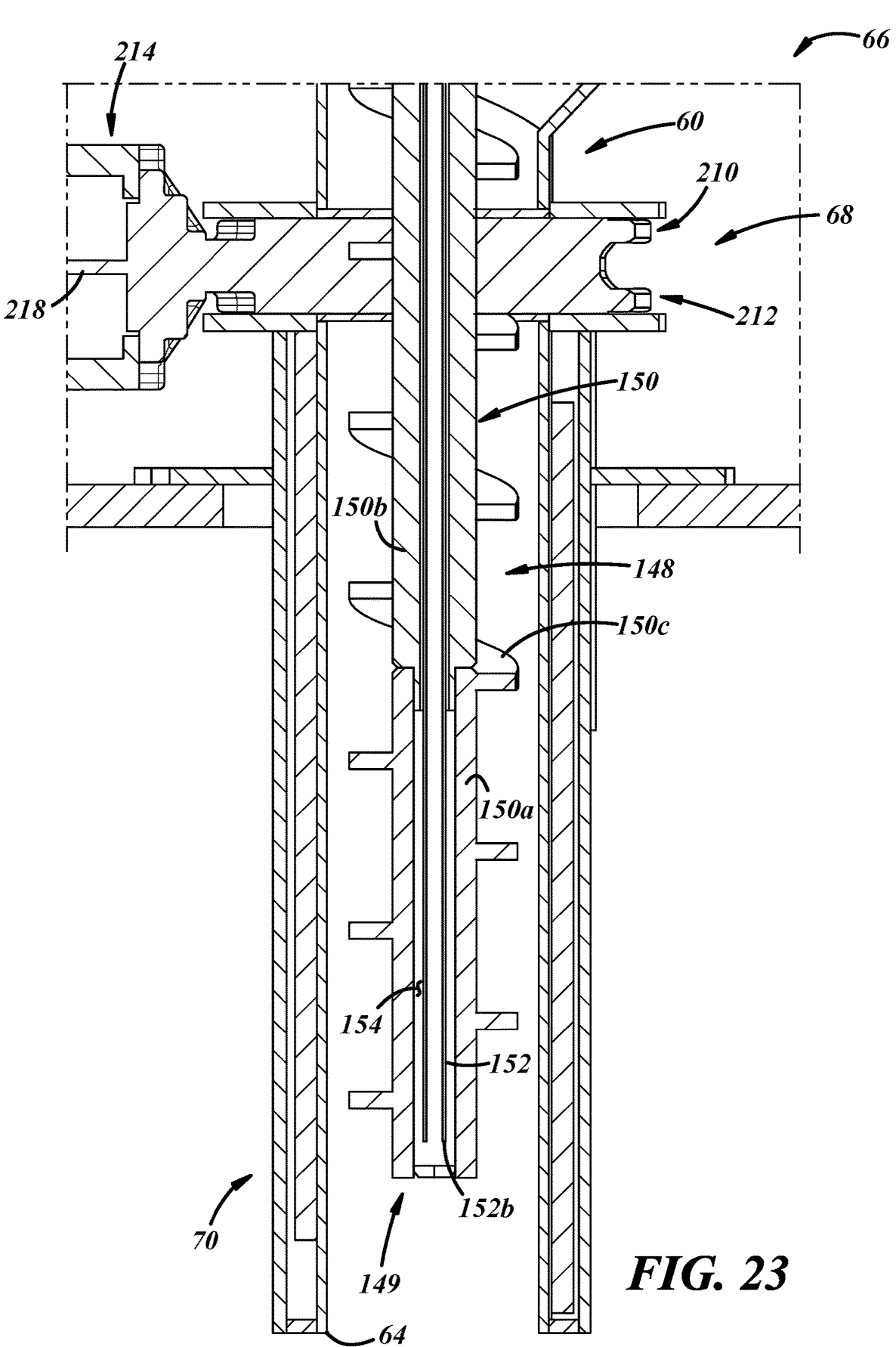
FIG. 23 is an enlarged, fragmentary, longitudinal sectional view of a lower portion of the feedstock charger shown in FIG. 22, illustrating a feedstock conveyor in a longitudinally advanced position.

With reference to FIGS. 14, 16, and 23, the feedstock mover 66 includes a feedstock conveyor 148 that is carried in the charger conduit 60 and that may be rotatable or translatable, or both rotatable and translatable as illustrated. In the illustrated embodiment, the feedstock conveyor 148 is an auger but, in other embodiments, may include a reciprocating plunger, pneumatic conveyor, or any suitable device for conveying feedstock from the feedstock inlet 62 toward the feedstock outlet 64. In an auger embodiment, the feedstock conveyor 148 may include a hollow shaft 150 having a downstream portion 150a with a closed downstream end and composed of a first material and an upstream portion 150b with an open upstream end and composed of a second material different than the first material, and one or more helical flights 150c around the downstream and upstream portions 150a,b.

With reference to FIGS. 9 and 14, the feedstock conveyor 148 may be fluid-cooled. In such a fluid-cooled embodiment, the feedstock mover 66 also may include a fluid conduit 152 extending longitudinally into the feedstock conveyor 148 and having an upstream inlet end 152a to receive fluid into the fluid conduit 152 and a downstream outlet end 152b terminating short of the closed end of the conveyor 148 to transmit fluid out of the fluid conduit 152 and into an annular space 154 (FIG. 23) radially between the fluid conduit 152 and the feedstock conveyor 148. The feedstock mover 66 also may include a rotary fluid coupling 156 having an inlet 156a in fluid communication with the upstream inlet end 152a of the fluid conduit 152 and an outlet 156b in fluid communication with the annular space 154 (FIG. 23).

Figure 22:
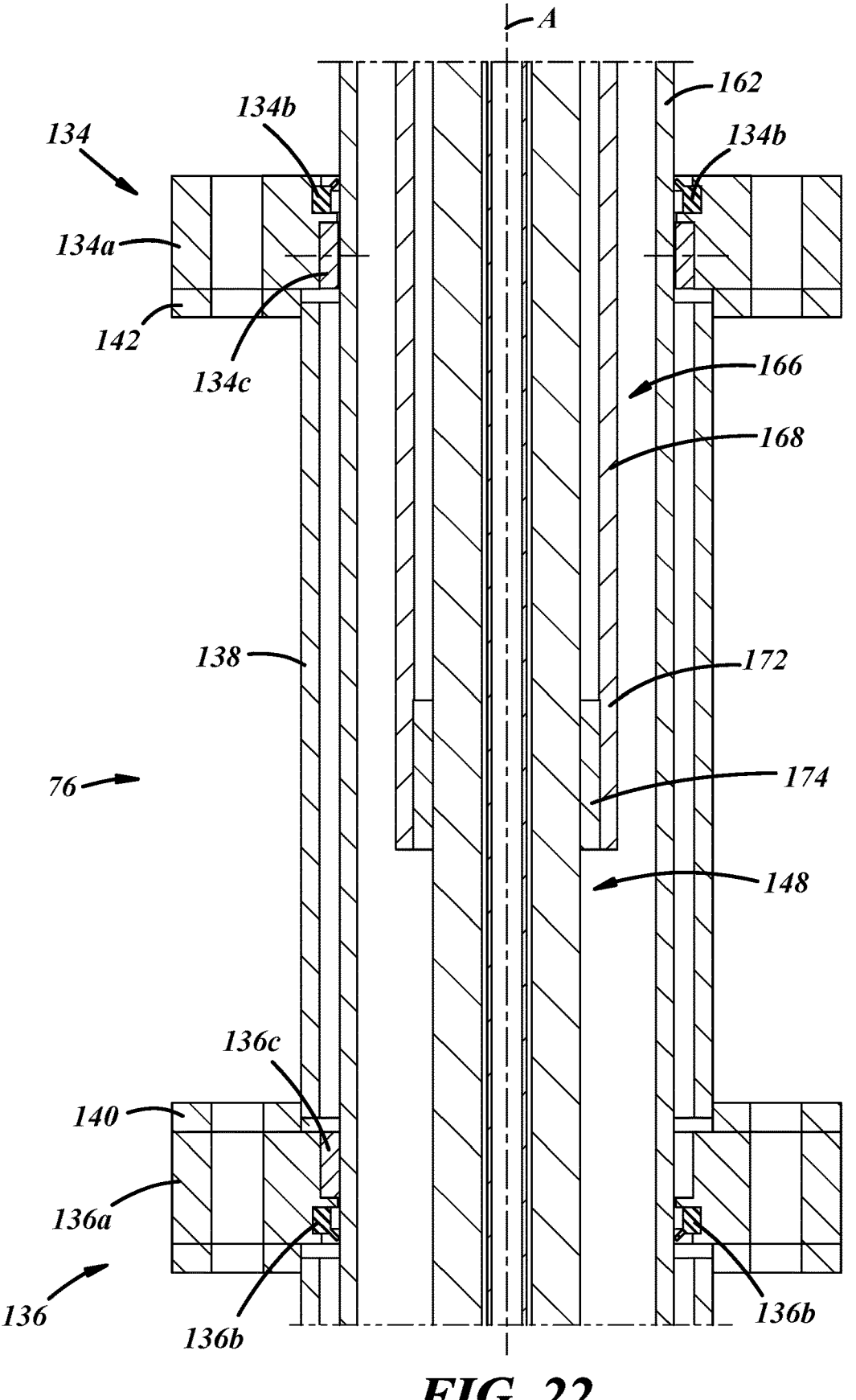
FIG. 22 is an enlarged, fragmentary, longitudinal sectional view of a portion of the feedstock charger of FIG. 7, taken from rectangle 22 of FIG. 9, and illustrating the conveyor guide conduit shown in FIG. 20 and a feedstock conveyor guide.

With reference to FIG. 14, the feedstock mover 66 also may include a feedstock conveyor guide 158 including an outer guide 160 having an outer guide cylinder 162 coaxial with and extending into the conveyor guide conduit 76, an upper alignment flange 163 welded, fastened, or otherwise coupled to the outer guide cylinder 162 proximate an upper end thereof, and outwardly extending driven or actuator mounts 164 proximate the alignment flange 163. With reference to FIG. 22, the outer guide cylinder 162 is in contact with the seal rings 134b, 136b of the conveyor guide conduit 76 to prevent or restrict egress of airborne feedstock particulate out through the charger. With reference again to FIG. 14, the upper alignment flange 163 may carry a shaft bearing 165, as will be described in more detail below. The feedstock conveyor guide 158 further may include an inner guide 166 having an inner guide cylinder 168 extending into the outer guide cylinder 162 and including an upper fixed end 170 operatively coupled to an upper portion of the outer guide cylinder 162. With reference to FIG. 23, the inner guide cylinder 168 also may include a lower free end 172 carrying a bushing 174 in contact with a cylindrical outer surface of the feedstock conveyor 148.

With reference to FIGS. 7-9 and 14, the feedstock mover 66 further may include a rotary actuator 176 coupled to the feedstock conveyor 148 to rotate the feedstock conveyor 148 about the axis A in the charger conduit 60, and/or a linear actuator 178 coupled to the feedstock conveyor 148 to linearly translate the feedstock conveyor 148 along the axis A in the charger conduit 60. The rotary actuator 176 may include an electric motor 180 and the linear actuator may include one or more pneumatic actuators 182. The pneumatic actuators 182 may have cylinders 184 that may be welded, fastened, or otherwise coupled to the actuator mounts 126 of the actuator mounting conduit 74, and piston rods 186 that may be welded, fastened, or otherwise coupled to the actuator mounts 164 of the feedstock conveyor guide 158. The cylinders and piston rods 184, 186 may be reversed, of course, and are preferably mounted to their respective mounts 126, 164 by single pivot pins or fasteners, for example, via adjustable clevis connections or the like. The pneumatic actuators 182 are carried alongside the charger conduit 60, more particularly, alongside the actuator mounting conduit 74 and the conveyor guide conduit 74. The feedstock mover 66 also may include a pneumatic controller 188 with suitable pneumatic valves, controls, and tubing (not separately shown) in communication between the valves and the actuators 182. The controller 188 may be mounted to the mounting plate 130 of the actuator mounting conduit 74. In other embodiments, the actuators 176, 178 may include hydraulic motors and/or actuators, or any other devices suitable to impart rotary and/or linear motion to the feedstock conveyor 148. In this regard, the actuators 176, 178 can include any components that create movement, including cylinders, pistons, springs, diaphragms, valves, motors, gears, pulleys, chains, screws, and/or the like. They can include energy sources and devices that are electric, pneumatic, hydraulic, and/or mechanical to cause rotary and/or linear motion.

With reference to FIG. 16, the feedstock mover 66 also may include a rotary actuator pedestal 190 coupled to the feedstock conveyor guide 158. More specifically, the pedestal 190 may include a downstream or lower plate 192 coupled to the upper fixed end 170 of the inner guide cylinder 168 of the inner guide 166 of the feedstock conveyor guide 158. The pedestal 190 also may include an upstream or upper plate 194 to carry the rotary actuator 176, and support gussets 196 extending between the plates 192, 194 to space the plates 192, 194 apart and support the pedestal 190. The pedestal 190 also may include a roller bearing 198 mounted to the lower plate 192 and through which the feedstock conveyor 148 rotatably extends to rotatably support an upper end of the feedstock conveyor 148. The feedstock mover 66 further may include a rotary encoder disc 200 carried by and coupled to the upper end of the feedstock conveyor 148, a rotary encoder sensor 202 carried by the rotary actuator pedestal 190 to sense rotation of the feedstock conveyor 148 via the rotary encoder disc 200, and a shaft collar 204 coupled to the feedstock conveyor 148 in a location between the rotary encoder disc 200 and the roller bearing 198. As illustrated in FIG. 9, the rotary actuator 176 is carried atop the charger conduit 60.

With reference to FIGS. 14 and 15, the feedstock mover 66 additionally may include an alignment rod 206 extending along a longitudinal alignment axis B laterally offset from the longitudinal charger axis A. The rod 206 may include a lower end 206a fixed with respect to the charger conduit 60, for example, to the conveyor guide conduit 76, and an upper end 206b relatively translatably coupled with respect to the feedstock conveyor guide 158, for example, coupled to the rotary actuator pedestal 190 and/or to the upper alignment flange 163 of the guide 158. The alignment rod 206 translatably extends through the alignment rod bearing 165. Also, the alignment rod 206 is carried in the semi-circular reliefs 140b, 142b (FIG. 20) and is coupled to the alignment rod mounting plate 144 of the conveyor guide conduit 76, for example, via U-bolts 208 and corresponding nuts (not shown).

With reference to FIGS. 7-14 and 23, the gate 68 may be any device suitable to open and close the charger conduit 60, particularly in a manner that restricts back flow of molten glass, feedstock particulates, or the like through the charger conduit 60. The illustrated gate 68 includes upper and lower annular mounts 210, 212 coupled to and between corresponding portions of the charger conduit 60 and establishing a passageway through the gate 68. The illustrated gate 68 also includes an actuator frame 214 coupled to the upper and lower annular mounts 210, 212 by welding, fastening, or in any other suitable manner, a linear actuator 216 coupled to the actuator frame 214 by welding, fastening, or in any other suitable manner, and a gate blade 218 coupled to the linear actuator 216 in any suitable manner and linearly movable between the upper and lower annular mounts 210, 212 to open and close the passageway of the gate 68. The illustrated gate 68 may be a knife gate device, but any other types of gates suitable for use with melting furnaces may be used, for example, radially moving iris valve gates, rotatably moving ball valve gates, or the like. In any case, the gate 68 is operated to include a closed state wherein a downstream end 149 of the feedstock conveyor 148 is positioned in a location upstream of the gate 68, for example, as shown in FIG. 9, and an open state wherein the downstream end 149 of the feedstock conveyor 148 is movable through the gate 68 to a location downstream of the gate 68, for example, as shown in FIG. 23. Of course, the feedstock conveyor 148 is retractable back through the gate 68, which may be advanced to close the charger conduit to allow repair or replacement of the feedstock conveyor 148 and/or other various components of the charger 14 while the system 10 is active or in a hot hold state.

With reference to FIG. 23, the downstream end 149 of the feedstock conveyor 148 may be configured to be recessed with respect to the outlet 64 established by the downstream end of the fluid-cooled spout 70 during normal operation of the system 10 (FIG. 1). Notably, if the feedstock conveyor 148 is not sufficiently linearly advanced to a position like that shown in FIG. 23, the feedstock conveyor 148 may experience an over torquing condition from having to push an excessive amount of feedstock from the downstream end 149 of the conveyor 148. Accordingly, to prevent damage to the conveyor 148 by over torquing of the conveyor 148 and/or by prolonged contact with molten glass, it is preferable to maintain the conveyor 148 in its normal extended position like that shown in FIG. 23, but only when feedstock is being fed by the conveyor 148 into the melter. Otherwise, when feedstock is not being fed into the melter, it is preferable to retract the conveyor 148 from its normal extended position like that shown in FIG. 23, preferably to a location upstream of the gate 68, to avoid direct contact between the conveyor 148 and molten glass. In such a recessed position during normal operation, the downstream end 149 of the feedstock conveyor 148 may be axially spaced from the downstream end of the spout 70 by about a 1:1 ratio of the axial distance to the inner diameter of the spout 70. But the ratio may vary between 0.5:1 and 2:1 including all ranges, sub-ranges, values, and endpoints of that range. By maintaining the ratio according to this range, the feedstock conveyor 148 can be protected from overexposure to molten glass and from over torquing conditions.

Figure 24:
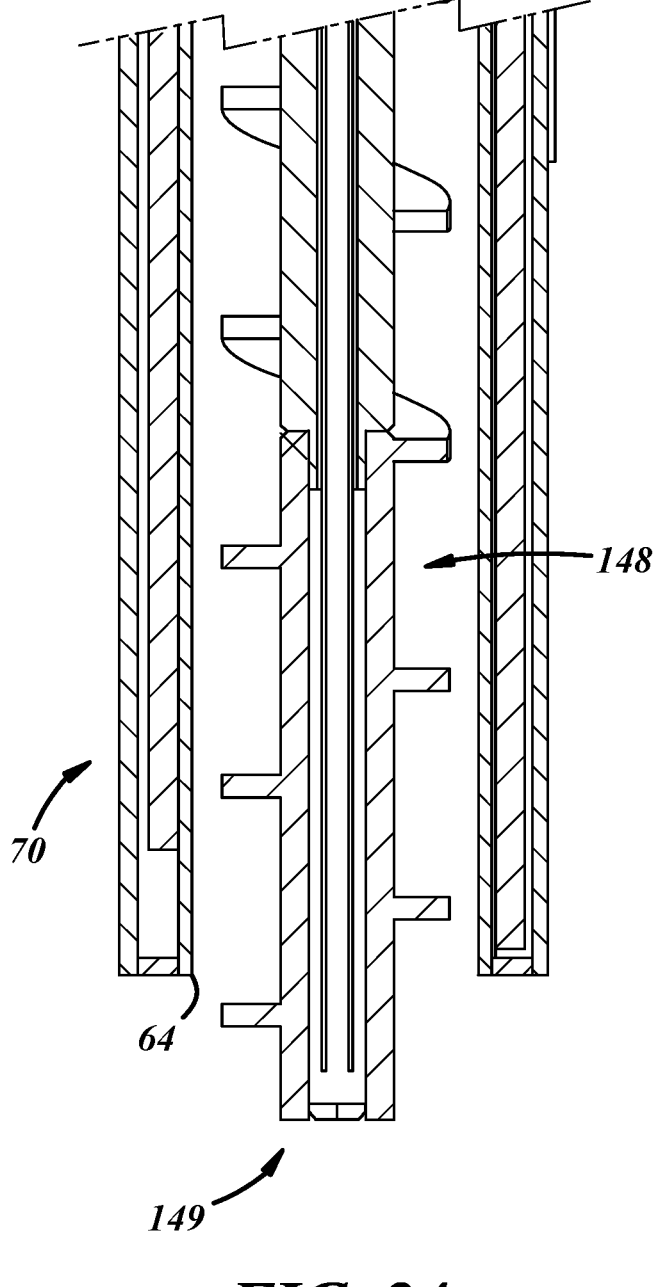
FIG. 24 is a further enlarged, fragmentary view of a lowermost portion of the feedstock charger shown in FIG. 23, illustrating the feedstock conveyor in a further longitudinally advanced position to clear blockages at a downstream end of the spout.

With reference to FIG. 24, by exception, for example, during a blockage clearing function, the downstream end 149 of the feedstock conveyor 148 may be configured to protrude axially beyond the outlet 64 established by the fluid-cooled spout 70 when it is desired to clear blockages created by a buildup of feedstock and/or frozen glass inside the downstream end of the spout 70. Once the blockage is cleared however, it is desirable to retract the feedstock conveyor 148 back to its recessed position with respect to the downstream end of the spout 70.

A method of using a feedstock charger is provided. For example, the method may include use of one or more of the variations of the melter 12 and/or feedstock charger 14 described above. According to an embodiment of the method, feedstock is supplied to the feedstock charger, for example, using a feedstock meter to advance feedstock into a hopper of the feedstock charger. Also, the feedstock is conveyed to a feedstock conveyor of the charger, for example, from the hopper through a wye branch of a charger conduit. Further, feedstock is allowed to fall through and out of the charger conduit, for example, by opening a gate that intersects the charger conduit or, in other embodiments where no gate is used, by simply providing an open path through the charger conduit. Additionally, the feedstock conveyor is rotated in the charger conduit, for example, by activating a rotary actuator coupled to the feedstock conveyor, and is linearly advanced in the charger conduit, for instance, through a gate when one is used, for example, by activating a linear actuator coupled to the feedstock conveyor. The feedstock conveyor may be advanced to a location where a downstream end of the feedstock conveyor is proximate, but axially recessed with respect to, a downstream end and feedstock outlet of the conduit. Once in that location, and during normal operation of the system, the feedstock conveyor may remain axially stationary and may be rotated continuously to convey feedstock out of the conduit. Of course, the rotational speed of the feedstock conveyor may be increased or decreased to correspondingly increase or decrease a flow rate of feedstock into the melter.

Additionally, the feedstock conveyor may be linearly retracted back through a gate when one is used, for example, by activating the linear actuator in reverse and, when used, the gate thereafter may be closed to prevent back flow of feedstock or molten material into the charger conduit upstream of the gate. In some embodiments, the feedstock conveyor may be advanced beyond a typical operating position to break through any blockage of particulate feedstock, frozen glass, or some combination thereof, near the feedstock outlet. The typical operating position may be a position where the downstream end of the feedstock conveyor is proximate, but axially recessed with respect to, the downstream end of the spout. The method may or may not include all of the disclosed steps or be sequentially processed or processed in the particular sequence discussed, and the presently disclosed manufacturing process and marking methods encompass any sequencing, overlap, or parallel processing of such steps.

As used in herein, the terminology "for example," "e.g.," for instance," "like," "such as," "comprising," "having," "including," and the like, when used with a listing of one or more elements, is to be construed as open-ended, meaning that the listing does not exclude additional elements. Also, as used herein, the term "may" is an expedient merely to indicate optionality, for instance, of a disclosed embodiment, element, feature, or the like, and should not be construed as rendering indefinite any disclosure herein. Moreover, directional words such as front, rear, top, bottom, upper, lower, radial, circumferential, axial, lateral, longitudinal, vertical, horizontal, transverse, and/or the like are employed by way of example and not necessarily limitation.

Finally, the subject matter of this application is presently disclosed in conjunction with several explicit illustrative embodiments and modifications to those embodiments, using various terms. All terms used herein are intended to be merely descriptive, rather than necessarily limiting, and are to be interpreted and construed in accordance with their ordinary and customary meaning in the art, unless used in a context that requires a different interpretation. And for the sake of expedience, each explicit illustrative embodiment and modification is hereby incorporated by reference into one or more of the other explicit illustrative embodiments and modifications. As such, many other embodiments, modifications, and equivalents thereto, either exist now or are yet to be discovered and, thus, it is neither intended nor possible to presently describe all such subject matter, which will readily be suggested to persons of ordinary skill in the art in view of the present disclosure. Rather, the present disclosure is intended to embrace all such embodiments and modifications of the subject matter of this application, and equivalents thereto, as fall within the broad scope of the accompanying claims.

14

The invention claimed is:

1. A feedstock charger, comprising:
a charger conduit extending along a longitudinal charger axis, and including an inlet to receive feedstock into the charger conduit, and an outlet to transmit feedstock out of the charger conduit; and
a feedstock mover cooperative with the charger conduit to move feedstock in a direction from the inlet toward the outlet, and including
a feedstock conveyor carried in the charger conduit, and
at least one actuator coupled to the feedstock conveyor and including
a rotary actuator configured to rotate the feedstock conveyor about the longitudinal charger axis, and
a linear actuator coupled to the charger conduit and to the feedstock conveyor and configured to linearly translate the feedstock conveyor along the longitudinal charger axis,
wherein the charger conduit also includes a spout including a spout downstream end establishing the outlet and wherein the spout is fluid-cooled and includes:
an outer wall,
an inner wall,
an annular space between the outer and inner walls,
downstream and upstream closures that close off the annular space,
inlet and outlet ports proximate an upstream end of the outer wall and extending therethrough in fluid communication with the annular space, and
a plurality of circumferentially spaced and longitudinally staggered baffles extending radially between and in contact with the outer and inner walls and extending longitudinally between the downstream and upstream closures to establish a serpentine path along and around the fluid-cooled spout between the inlet and outlet ports.

2. The feedstock charger of claim 1, wherein the charger conduit also includes a spout including a spout downstream end establishing the outlet, and wherein the at least one actuator is configured to linearly translate the feedstock conveyor relative to the spout so that a downstream end of the feedstock conveyor extends axially past the outlet.

3. The feedstock charger of claim 1, further comprising:
a fluid conduit extending longitudinally into the feedstock conveyor and having an upstream inlet end to receive fluid into the fluid conduit and a downstream outlet end to transmit fluid out of the fluid conduit and into an annular space radially between the fluid conduit and the feedstock conveyor; and
a rotary fluid coupling having an inlet in fluid communication with the upstream inlet end of the fluid conduit and an outlet in fluid communication with the annular space.

4. The feedstock charger of claim 1, wherein the charger conduit also includes:
an actuator mount conduit upstream of and coaxial with a charger junction conduit, and including an outwardly extending drive mount coupled to the linear actuator; and
a conveyor guide conduit upstream of and coaxial with the actuator mount conduit and including seal and bushing assemblies including mounting rings, seal rings carried by the mounting rings, and bushings carried by the mounting rings.

5. A feedstock charger, comprising:

a charger conduit extending along a longitudinal charger axis, and including an inlet to receive feedstock into the charger conduit, and an outlet to transmit feedstock out of the charger conduit;

a feedstock mover cooperative with the charger conduit to move feedstock in a direction from the inlet toward the outlet, and including a feedstock conveyor carried in the charger conduit, and at least one actuator coupled to the feedstock conveyor and configured to rotate the feedstock conveyor about the longitudinal charger axis and linearly translate the feedstock conveyor along the longitudinal charger axis; and a gate intersecting the charger conduit downstream of the inlet and including a closed state wherein a downstream end of the feedstock conveyor is positioned in a location upstream of the gate and an open state wherein the downstream end of the feedstock conveyor is movable through the gate to a location downstream of the gate, wherein the charger conduit includes:

a spout including a spout upstream portion having a spout upstream end downstream of the gate; and a charger junction conduit including a feedstock mover portion coaxial with the feedstock mover, a feedstock inlet portion transversely oriented with respect to the feedstock mover portion, and a junction downstream end upstream of the gate.

6. The feedstock charger of claim 5, wherein at least portions of the charger conduit and the feedstock mover are fluid cooled, and wherein the gate is not fluid cooled.

7. The feedstock charger of claim 5, wherein the gate includes:

upper and lower annular mounts coupled to and between corresponding portions of the charger conduit and establishing a passageway through the gate;

an actuator frame coupled to the upper and lower annular mounts;

a linear actuator coupled to the actuator frame; and a gate blade coupled to the linear actuator and slidable between the upper and lower annular mounts to open and close the passageway.

8. A feedstock charger, comprising:

a charger conduit extending along a longitudinal charger axis, and including an inlet to receive feedstock into the charger conduit, and an outlet to transmit feedstock out of the charger conduit; and a feedstock mover cooperative with the charger conduit to move feedstock in a direction from the inlet toward the outlet, and including a feedstock conveyor carried in the charger conduit, wherein the feedstock conveyor is an auger including:

a hollow shaft having a downstream portion with a closed downstream end and composed of a first material and an upstream portion with an open upstream end and composed of a second material different than the first material, and a helical flight around the downstream and upstream ends; and at least one actuator coupled to the feedstock conveyor, and including a rotary actuator coupled to the feedstock conveyor to rotate the feedstock conveyor about the longitudinal charger axis, and the at least one actuator configured to linearly translate the feedstock conveyor along the longitudinal charger axis.

9. A feedstock charger, comprising:

a charger conduit extending along a longitudinal charger axis, and including an inlet to receive feedstock into the charger conduit, and an outlet to transmit feedstock out of the charger conduit; and a feedstock mover cooperative with the charger conduit to move feedstock in a direction from the inlet toward the outlet, and including a feedstock conveyor carried in the charger conduit, and at least one actuator coupled to the feedstock conveyor and configured to rotate the feedstock conveyor about the longitudinal charger axis and linearly translate the feedstock conveyor along the longitudinal charger axis, wherein the charger conduit also includes:

an actuator mount conduit upstream of and coaxial with a charger junction conduit, and including an outwardly extending drive mount coupled to the linear actuator; and a conveyor guide conduit upstream of and coaxial with the actuator mount conduit and including seal and bushing assemblies including mounting rings, seal rings carried by the mounting rings, and bushings carried by the mounting rings; and wherein the feedstock mover also includes:

a feedstock conveyor guide including an outer guide having an outer guide cylinder coaxial with and extending into the conveyor guide conduit in contact with the seal rings, and including an outwardly extending driven mount coupled to the linear actuator.

10. The feedstock charger of claim 9, wherein the feedstock conveyor guide further includes an inner guide having an inner guide cylinder extending into the outer guide cylinder and including an upper fixed end coupled to an upstream portion of the outer guide cylinder and a downstream free end carrying a bushing in contact with the feedstock conveyor.

11. The feedstock charger of claim 9, wherein the feedstock mover additionally includes:

an alignment rod extending along a longitudinal alignment axis laterally offset from the longitudinal charger axis and including a downstream end fixed with respect to the charger conduit and an upstream end relatively translatably coupled with respect to the feedstock conveyor guide.

12. The feedstock charger of claim 11, wherein the feedstock conveyor guide also includes a mounting flange carrying an alignment rod bearing through which the alignment rod translatably extends, and wherein the conveyor guide conduit includes radially outwardly projecting alignment rod mounting portions with semi-circular reliefs, wherein the alignment rod is carried by the semi-circular reliefs and coupled to the conveyor guide conduit.

13. The feedstock charger of claim 9, wherein the feedstock mover also includes:

a rotary actuator coupled to the feedstock conveyor to rotate the feedstock conveyor;

a rotary actuator pedestal coupled to the feedstock conveyor guide and including a downstream plate coupled to the feedstock conveyor guide, an upstream plate to carry the rotary actuator, and support gussets extending between the downstream and upstream plates; and a roller bearing mounted to the downstream plate and through which the feedstock conveyor rotatably extends.

14. The feedstock charger of claim 13, wherein the feedstock mover further includes:

a rotary encoder disc carried by the feedstock mover; and a rotary encoder sensor carried by the rotary actuator pedestal to sense rotation of the feedstock mover via the rotary encoder disc.

15. The feedstock charger of claim 14, wherein the feedstock mover additionally includes:

a shaft collar fastened to the feedstock conveyor in a location between the rotary encoder disc and the roller bearing.

16. A feedstock charger, comprising:

a charger conduit extending along a longitudinal charger axis, and including an inlet to receive feedstock into the charger conduit, and an outlet to transmit feedstock out of the charger conduit; and a feedstock mover cooperative with the charger conduit to move feedstock in a direction from the inlet toward the outlet, and including a feedstock conveyor carried in the charger conduit, and at least one actuator configured to rotate the feedstock conveyor about the longitudinal charger axis and linearly translate the feedstock conveyor along the longitudinal charger axis so that a downstream end of the feedstock conveyor extends axially past the outlet, wherein the at least one actuator includes a rotary actuator configured to rotate the feedstock conveyor and a linear actuator configured to translate the feedstock conveyor, wherein the feedstock mover also includes a feedstock conveyor guide including an outer guide including an outer guide cylinder, and an actuator mount coupled to the outer guide cylinder and coupled to the linear actuator, and an inner guide including an inner guide cylinder extending into the outer guide cylinder, and a pedestal coupled to the inner guide cylinder and carrying the rotary actuator.

17. The feedstock charger of claim 16, wherein the charger conduit also includes a fluid-cooled spout including a spout downstream end establishing the outlet.

18. The feedstock charger of claim 16, wherein the feedstock mover also includes a feedstock conveyor guide coupled to both the rotary actuator and the linear actuator.

19. The feedstock charger of claim 18, wherein the feedstock conveyor guide includes an outer guide including an outer guide cylinder, and an inner guide including an inner guide cylinder extending into the outer guide cylinder.

20. The feedstock charger of claim 19, wherein the feedstock mover also includes a pedestal coupled to the inner guide cylinder and carrying the rotary actuator.

21. The feedstock charger of claim 19, wherein the feedstock mover also includes an actuator mount coupled to the outer guide cylinder and coupled to the linear actuator.

22. The feedstock charger of claim 19, wherein the feedstock mover also includes a pedestal coupled to the inner guide cylinder and carrying the rotary actuator, and an actuator mount coupled to the outer guide cylinder and coupled to the linear actuator.

23. The feedstock charger of claim 19, wherein the outer guide also includes an upper alignment flange coupled to the outer guide cylinder and carrying an alignment rod bearing.

24. The feedstock charger of claim 23, wherein the feedstock mover also includes an alignment rod extending along a longitudinal alignment axis laterally offset from the longitudinal charger axis and including a downstream end fixed with respect to the charger conduit and an upstream end extending translatably through the alignment rod bearing.

25. The feedstock charger of claim 19, wherein the feedstock mover also includes an alignment rod extending along a longitudinal alignment axis laterally offset from the longitudinal charger axis and including a downstream end fixed with respect to the charger conduit and an upstream end relatively translatably coupled with respect to the feedstock conveyor guide.

26. The feedstock charger of claim 16, wherein the outer guide also includes an upper alignment flange coupled to the outer guide cylinder and carrying an alignment rod bearing.

27. The feedstock charger of claim 26, wherein the feedstock mover also includes an alignment rod extending along a longitudinal alignment axis laterally offset from the longitudinal charger axis and including a downstream end fixed with respect to the charger conduit and an upstream end extending translatably through the alignment rod bearing.

* * * * *